US012797727B2

(12) United States Patent
Xu

(10) Patent No.: US 12,797,727 B2
(45) Date of Patent: Nov. 17, 2026

(54) DEVICE CONTROL METHOD AND APPARATUS, COMPUTER DEVICE, AND STORAGE MEDIUM FOR CONTROLLING GAME WITH VIRTUAL CONTROLLER

(71) Applicant: TENCENT TECHNOLOGY (SHENZHEN) COMPANY LTD, Shenzhen (CN)

(72) Inventor: Minhua Xu, Shenzhen (CN)

(73) Assignee: TENCENT TECHNOLOGY (SHENZHEN) COMPANY LTD, Shenzhen (CN)

( * ) Notice: Subject to any disclaimer, the term of this patent is extended or adjusted under 35 U.S.C. 154(b) by 718 days.

(21) Appl. No.: 18/184,293

(22) Filed: Mar. 15, 2023

(65) Prior Publication Data

US 2023/0211235 A1 Jul. 6, 2023

Related U.S. Application Data

(63) Continuation of application No. PCT/CN2022/088472, filed on Apr. 22, 2022.

(30) Foreign Application Priority Data

May 28, 2021 (CN) ......................... 202110596465.8

(51) Int. Cl.
*A63F 13/533* (2014.01)
*A63F 13/213* (2014.01)
(Continued)

(52) U.S. Cl.
CPC .......... *A63F 13/533* (2014.09); *A63F 13/213* (2014.09); *A63F 13/26* (2014.09);
(Continued)

(58) Field of Classification Search
CPC ...... A63F 13/213; A63F 13/219; A63F 13/26; A63F 13/335; A63F 13/426; A63F 13/533; A63F 13/69; A63F 13/77; A63F 13/847
See application file for complete search history.

(56) References Cited

U.S. PATENT DOCUMENTS 8,475,282 B1 * 7/2013 Herring ................. A63F 13/352 463/1
9,757,647 B2 * 9/2017 Fujita .................... A63F 13/213
(Continued)

FOREIGN PATENT DOCUMENTS

CN 102830926 A 12/2012
CN 103327109 A 9/2013
(Continued)

OTHER PUBLICATIONS

International Search Report for PCT/CN2022/088472 dated Jul. 20, 2022 [PCT/ISA/210].
(Continued)

*Primary Examiner* — William H Mcculloch, Jr.
(74) *Attorney, Agent, or Firm* — Sughrue Mion, PLLC

(57) ABSTRACT

A device control method includes: displaying, in a target control interface of a target control device, responsive to a display device displaying a game screen for a first game scene of a target game, a target virtual controller in a first style fitting the first game scene; updating the game screen for the first game scene displayed in the display device responsive to control via the target virtual controller in the first style; displaying, in the target control interface, responsive to the game screen displayed by the display device switching from the first game scene to a second game scene of the target game, the target virtual controller in a second style fitting the second game scene; and updating a game
(Continued)

screen for the second game scene displayed in the display device responsive to control via the target virtual controller in the second style.

20 Claims, 17 Drawing Sheets

(51) Int. Cl.
*A63F 13/26* (2014.01)
*A63F 13/426* (2014.01)
*A63F 13/69* (2014.01)
*A63F 13/77* (2014.01)
*A63F 13/847* (2014.01)
*A63F 13/219* (2014.01)
*A63F 13/335* (2014.01)

(52) U.S. Cl.
CPC ............ *A63F 13/426* (2014.09); *A63F 13/69* (2014.09); *A63F 13/77* (2014.09); *A63F 13/847* (2014.09); *A63F 13/219* (2014.09); *A63F 13/335* (2014.09)

(56) References Cited

U.S. PATENT DOCUMENTS

| | | | | |
|---|---|---|---|---|
| 10,010,789 | B2 * | 7/2018 | Koizumi | A63F 13/23 |
| 10,583,356 | B2 * | 3/2020 | Koizumi | A63F 13/23 |
| 10,806,997 | B2 * | 10/2020 | Winick | G06F 8/30 |
| 11,344,809 | B2 * | 5/2022 | Kando | G06F 3/04842 |
| 11,497,989 | B2 * | 11/2022 | Umeki | A63F 13/34 |
| 11,547,931 | B2 * | 1/2023 | Munson | G06F 3/02 |
| 11,559,742 | B2 * | 1/2023 | Kando | G06F 1/1669 |
| 11,712,625 | B2 * | 8/2023 | Kando | G06F 3/0346 463/31 |
| 11,794,094 | B2 * | 10/2023 | Jeffery | G06F 3/041 |
| 11,831,566 | B2 * | 11/2023 | Xu | H04N 21/816 |
| 2009/0204663 | A1 * | 8/2009 | Patwari | H04N 21/26613 709/203 |
| 2016/0361641 | A1 * | 12/2016 | Koizumi | A63F 13/23 |
| 2017/0052750 | A1 * | 2/2017 | Koizumi | A63F 13/23 |
| 2018/0104573 | A1 * | 4/2018 | Jeffery | G06F 3/017 |
| 2018/0345130 | A1 * | 12/2018 | Wells | A63F 13/92 |
| 2018/0369692 | A1 * | 12/2018 | Winick | A63F 13/355 |
| 2019/0096274 | A1 | 3/2019 | Solomon et al. | |
| 2020/0368622 | A1 * | 11/2020 | Kando | G06F 1/1669 |
| 2020/0374242 | A1 * | 11/2020 | Xu | G06T 9/00 |
| 2023/0211235 | A1 * | 7/2023 | Xu | A63F 13/213 463/31 |

FOREIGN PATENT DOCUMENTS

| | | | |
|---|---|---|---|
| CN | 104587669 | A | 5/2015 |
| CN | 107249704 | A | 10/2017 |
| CN | 110339568 | A | 10/2019 |
| CN | 111643889 | A | 9/2020 |
| CN | 113018851 | A | 6/2021 |

OTHER PUBLICATIONS

Written Opinion for PCT/CN2022/088472 dated Jul. 20, 2022 [PCT/ISA/237].

* cited by examiner

DEVICE CONTROL METHOD AND APPARATUS, COMPUTER DEVICE, AND STORAGE MEDIUM FOR CONTROLLING GAME WITH VIRTUAL CONTROLLER

CROSS-REFERENCE TO RELATED APPLICATIONS

This application is a bypass continuation application of International Patent Application No. PCT/CN2022/088472, filed on Apr. 22, 2022, which is based on and claims priority to Chinese Patent Application No. 202110596465.8, filed with the China Patent Office on May 28, 2021, the disclosures of which are incorporated herein by reference in their entireties.

BACKGROUND

1. Field

This application relates to the field of computer technologies, and in particular, to a device control method and apparatus, a computer device, and a computer-readable storage medium.

2. Description of Related Art

With the rapid development of computer technologies, games have gradually become a very common form of entertainment in people's daily life. Currently, a common game control manner is to control a game by touching a specified component on a game screen. In this manner, a component configured to control the game and the game screen are displayed on a same user equipment together. The equipment further needs to respond to various operations triggered by a user while displaying the game screen, so normal operation of the game needs to consume a lot of operating resources inside the user equipment, such as computing resources and memory resources of the user equipment. As a result, the user equipment is under high operating pressure, and in severe cases, the user equipment may become hot, shortening the service life of the user equipment.

SUMMARY

In accordance with certain embodiments of the present disclosure, a device control method is provided. The method includes displaying, in a target control interface of a target control device, responsive to a display device displaying a game screen for a first game scene of a target game, a target virtual controller in a first style fitting the first game scene; updating the game screen for the first game scene displayed in the display device responsive to control via the target virtual controller in the first style; displaying, in the target control interface, responsive to the game screen displayed by the display device switching from the first game scene to a second game scene of the target game, the target virtual controller in a second style fitting the second game scene; and updating a game screen for the second game scene displayed in the display device responsive to control via the target virtual controller in the second style.

In accordance with other embodiments of the present disclosure, a device control apparatus is provided. The apparatus includes a display unit configured to display, in a target control interface of a target control device, responsive to a display device displaying a game screen for a first game scene of a target game, a target virtual controller in a first style fitting the first game scene, and to display, in the target control interface, responsive to the game screen displayed by the display device switching from the first game scene to a second game scene of the target game, the target virtual controller in a second style fitting the second game scene. The apparatus also includes a processing unit configured to update the game screen for the first game scene displayed in the display device responsive to control via the target virtual controller in the first style, and to update a game screen for the second game scene displayed in the display device responsive to control via the target virtual controller in the second style.

In accordance with still other embodiments of the present disclosure, one or more non-transitory computer-readable storage media are provided. The storage media store computer-readable instructions which, when executed by one or more processors, cause the one or more processors to perform the above device control method.

BRIEF DESCRIPTION OF THE DRAWINGS

To describe the technical solutions of the embodiments of the disclosure more clearly, the following briefly introduces the accompanying drawings required for describing the embodiments. The accompanying drawings described herein show only some embodiments of the disclosure, and a person of ordinary skill in the art may still derive other drawings from these accompanying drawings without creative efforts.

Figure 2:
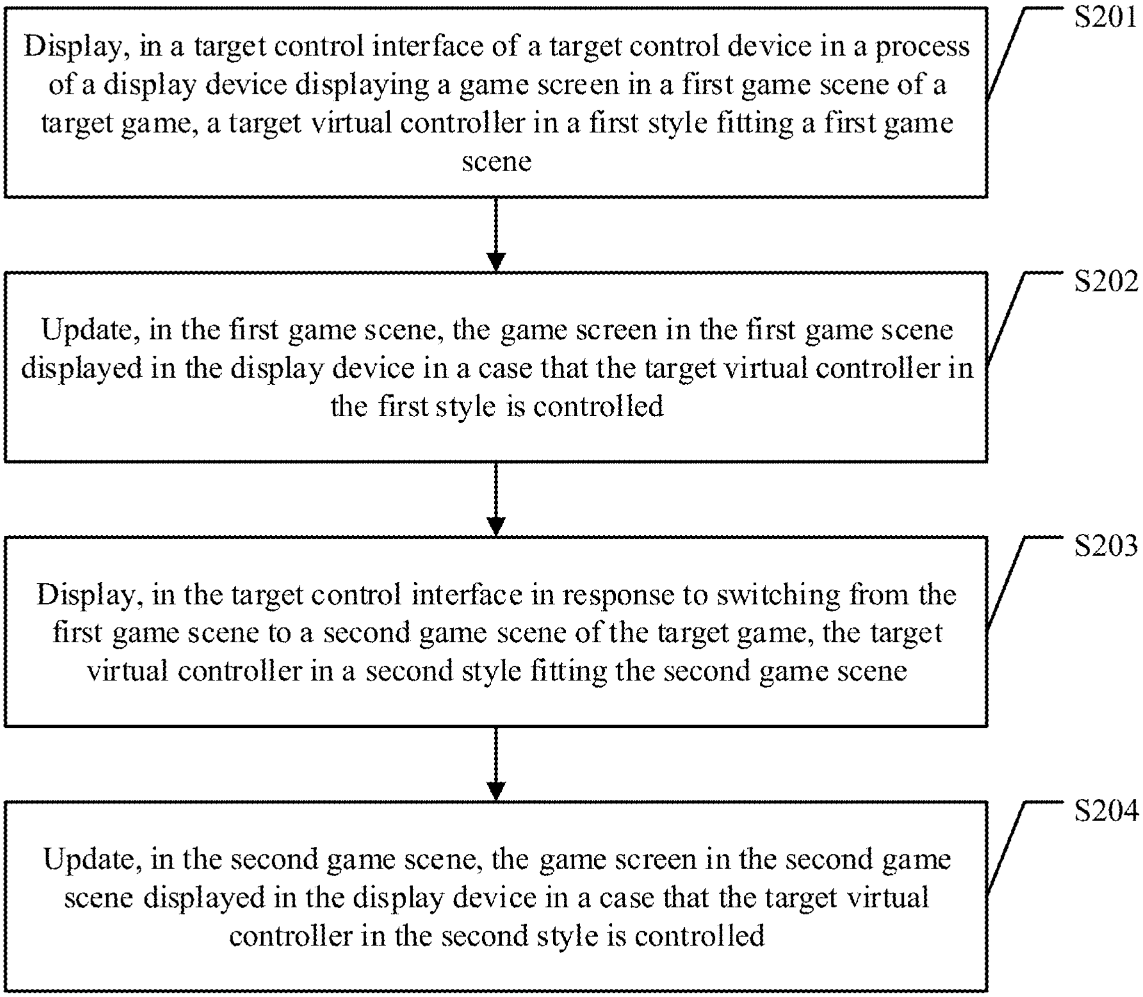
Figure 3A:
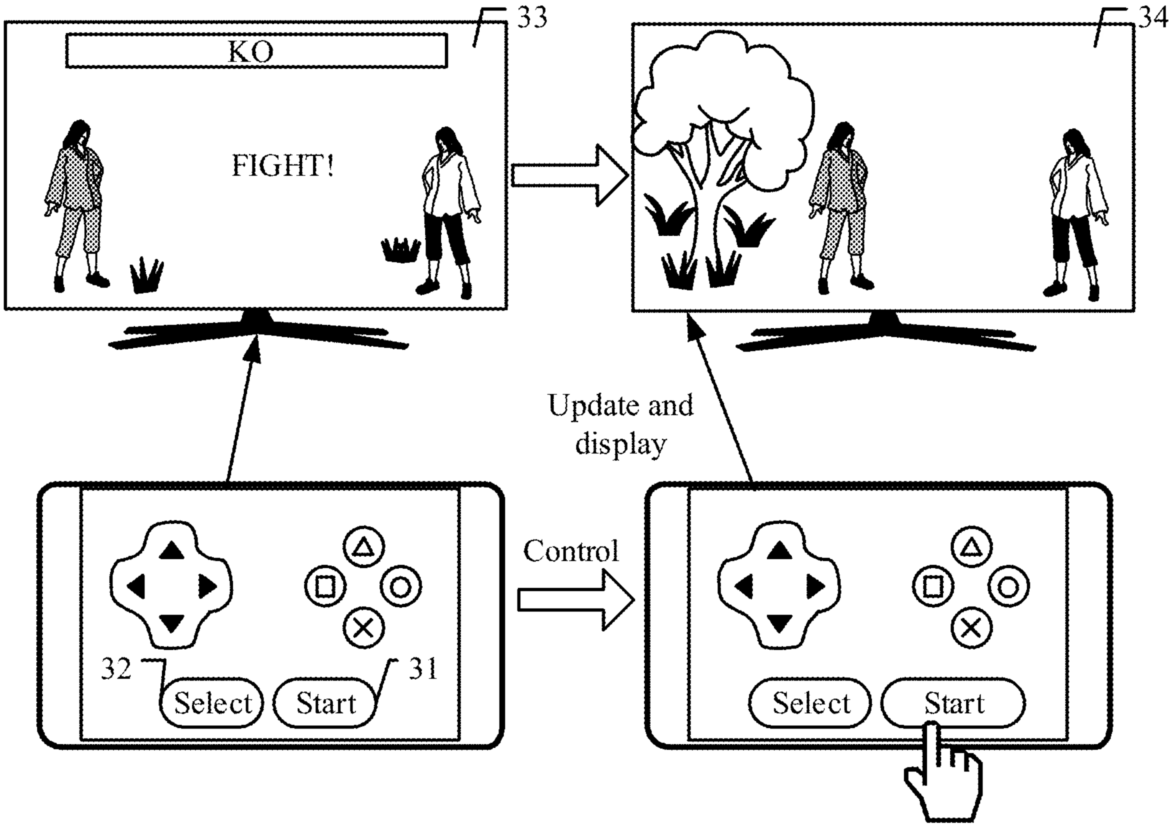
Figure 3B:
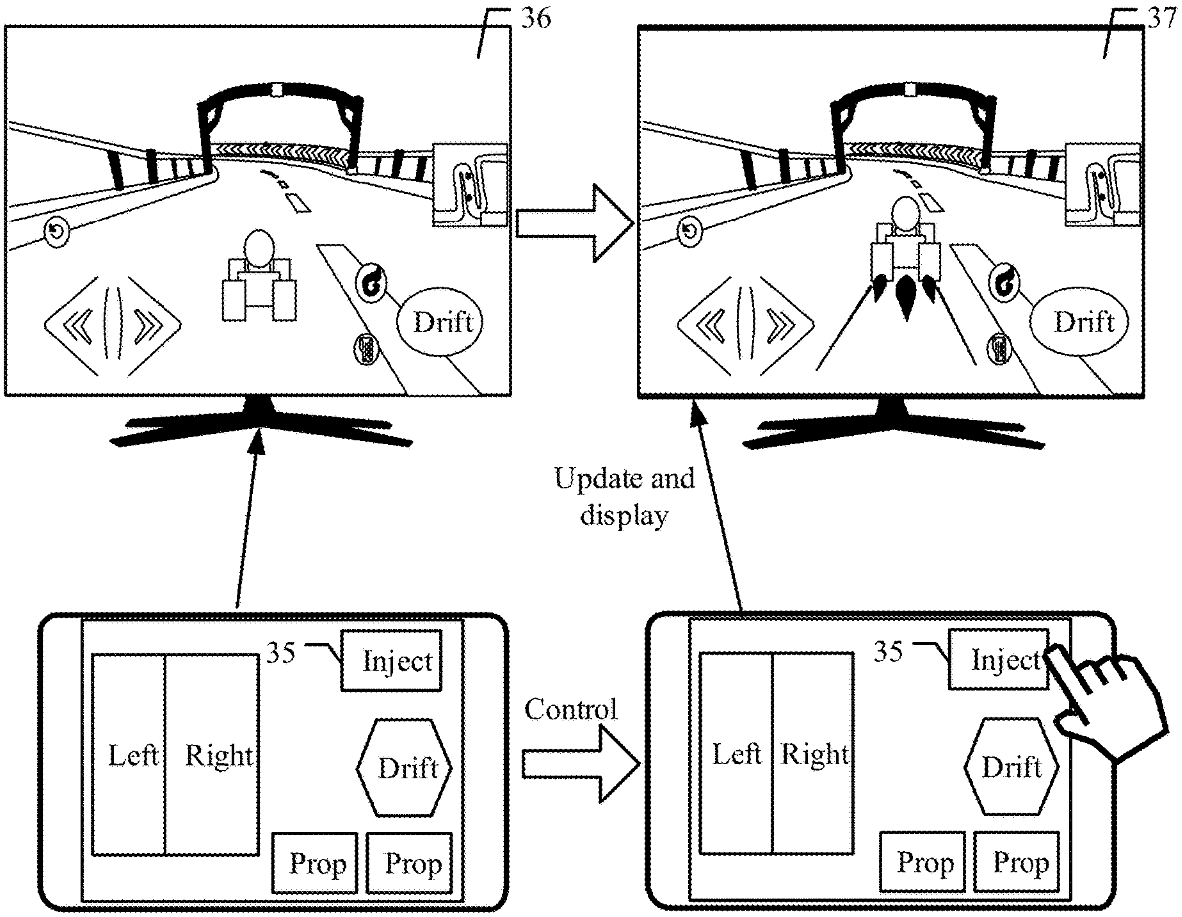
Figure 3C:
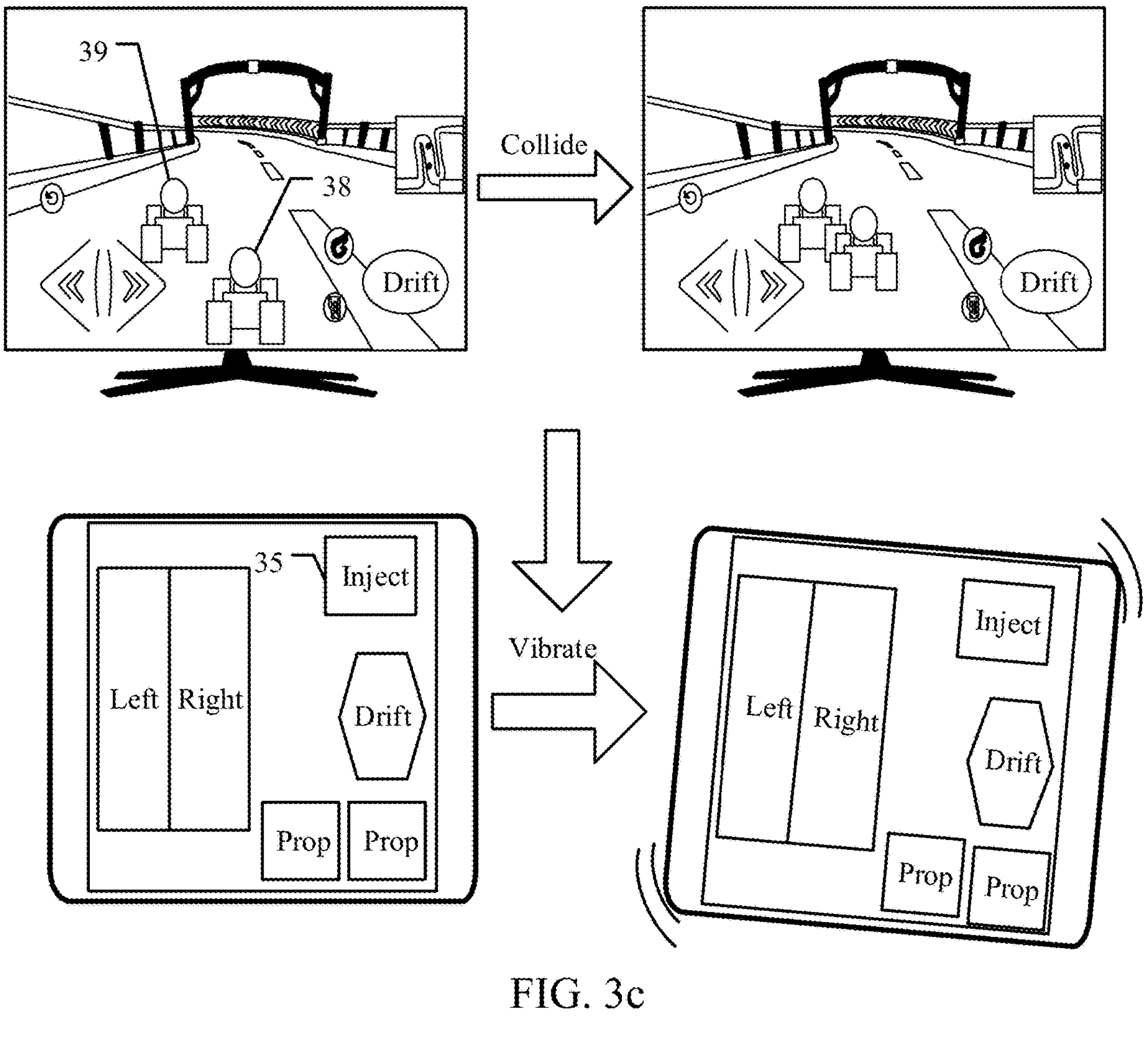
Figure 3D:
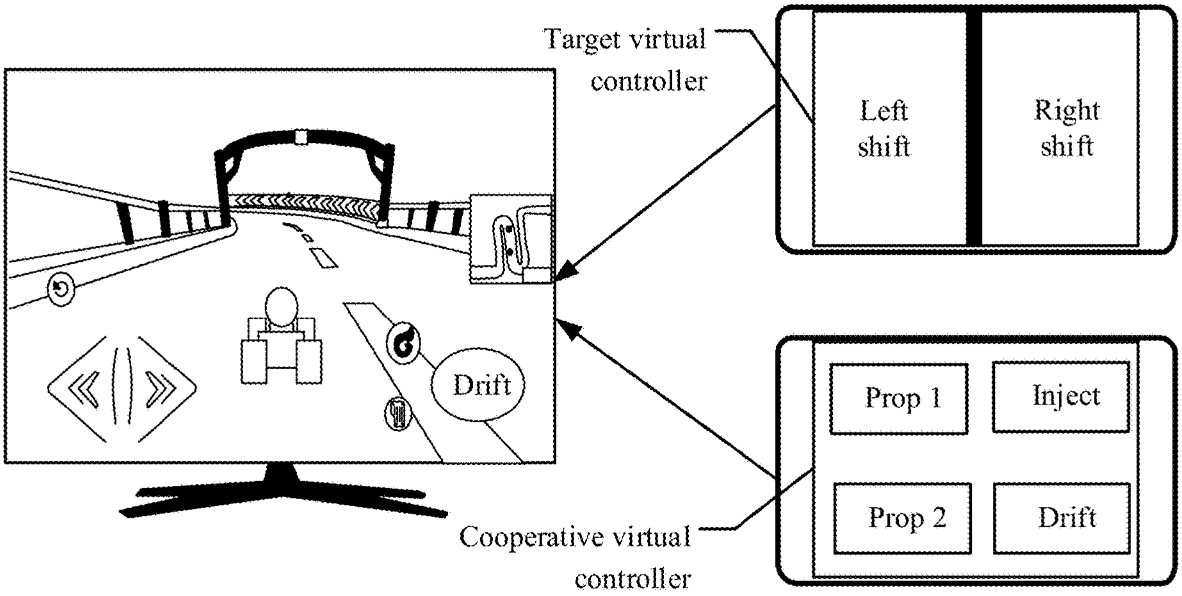
Figure 3E:
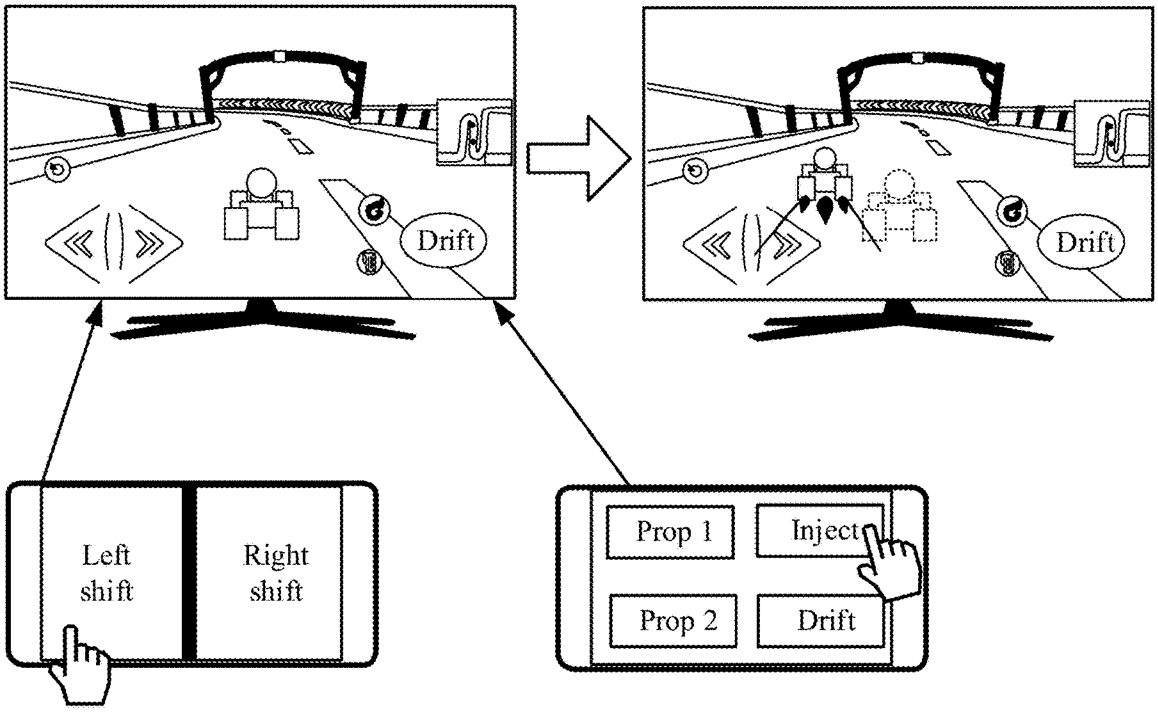
Figure 4A:
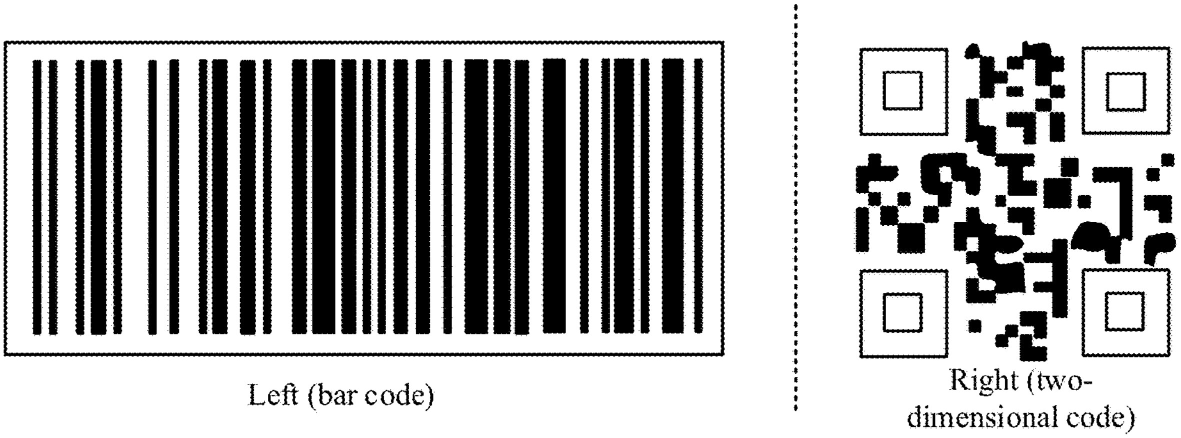
Figure 4B:
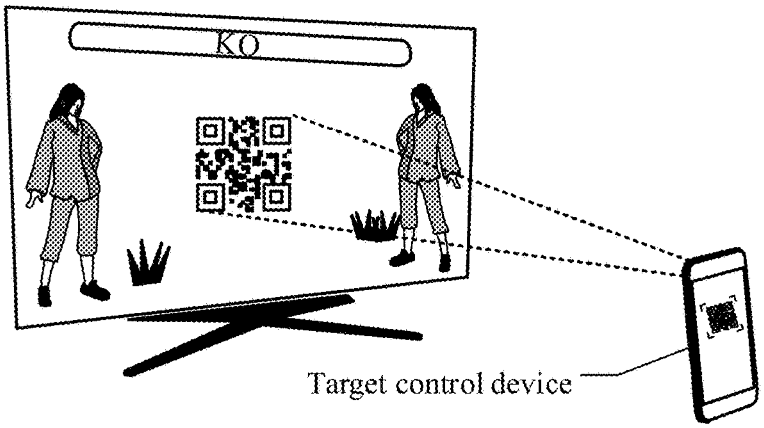
Figure 4C:
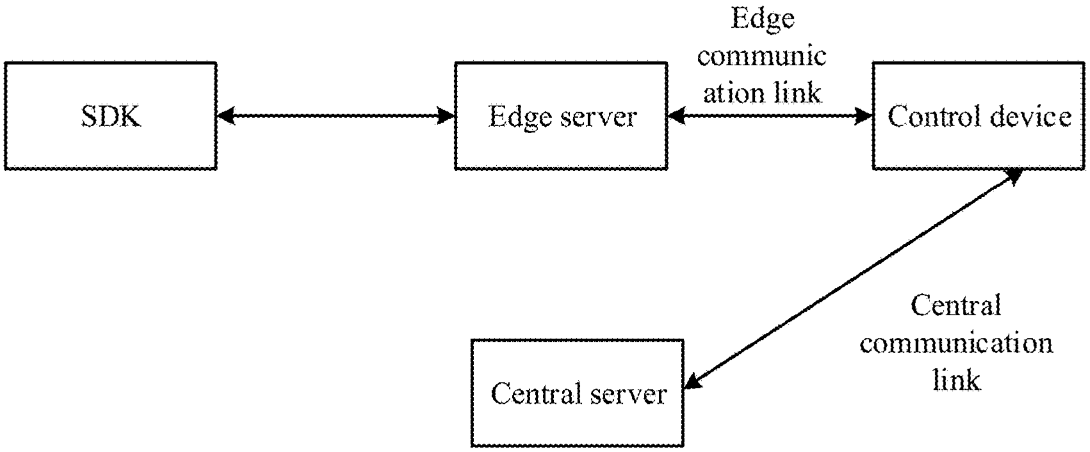
Figure 4D:
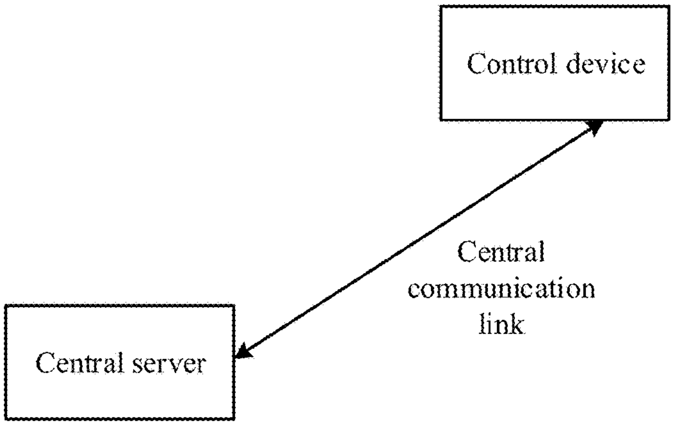
Figure 4E:
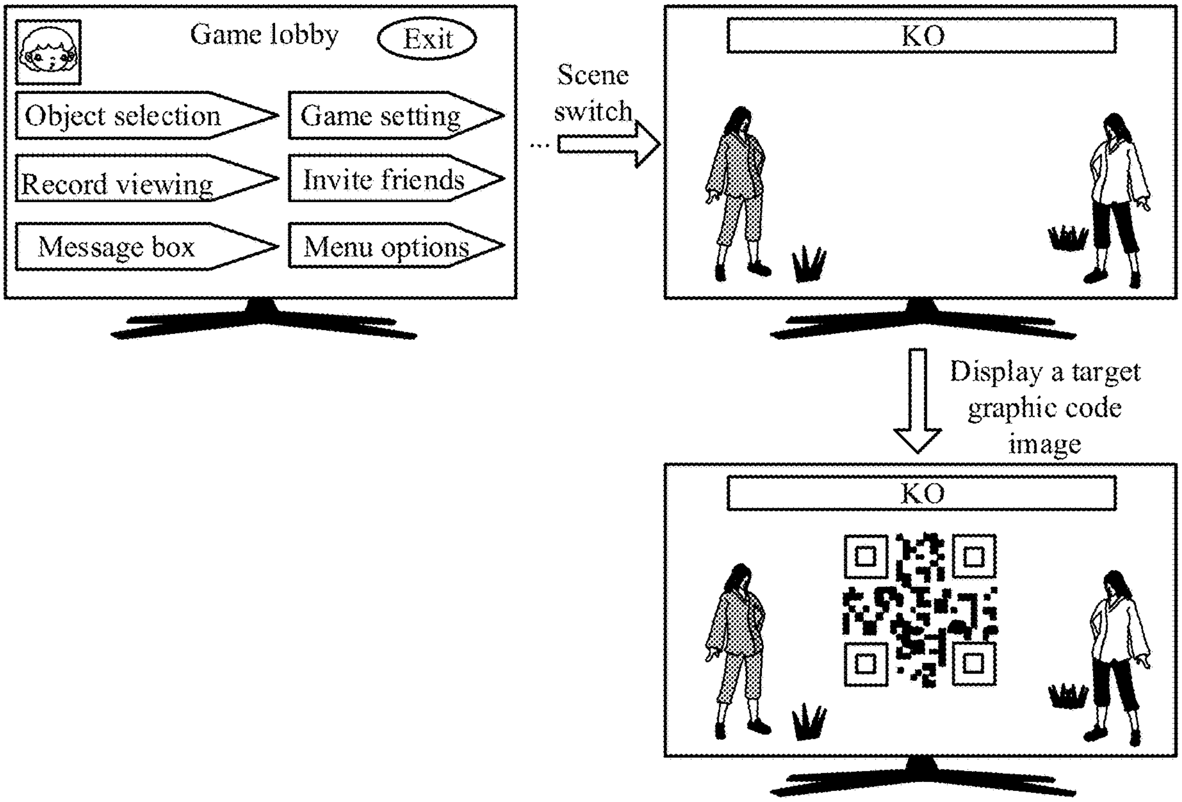
Figure 5A:
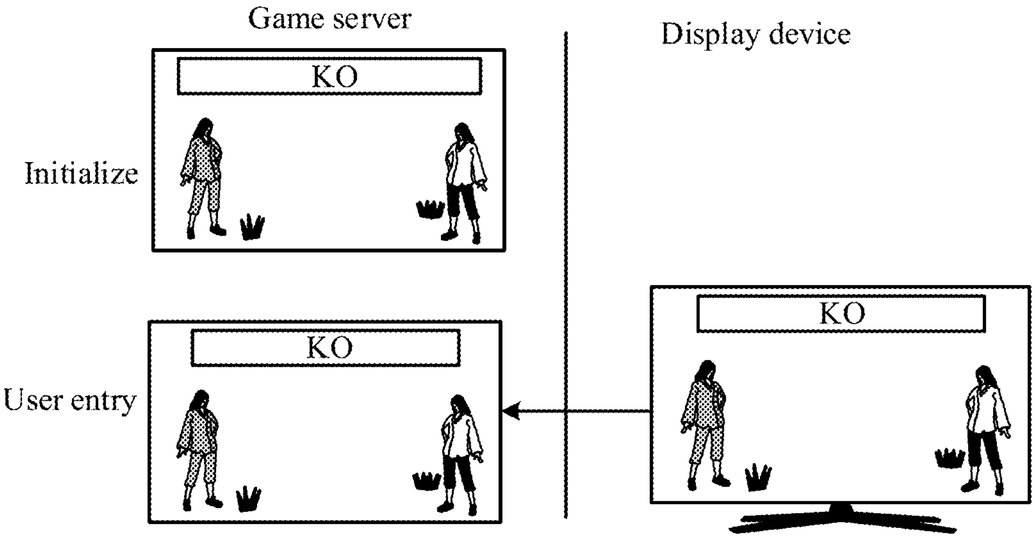
Figure 5B:
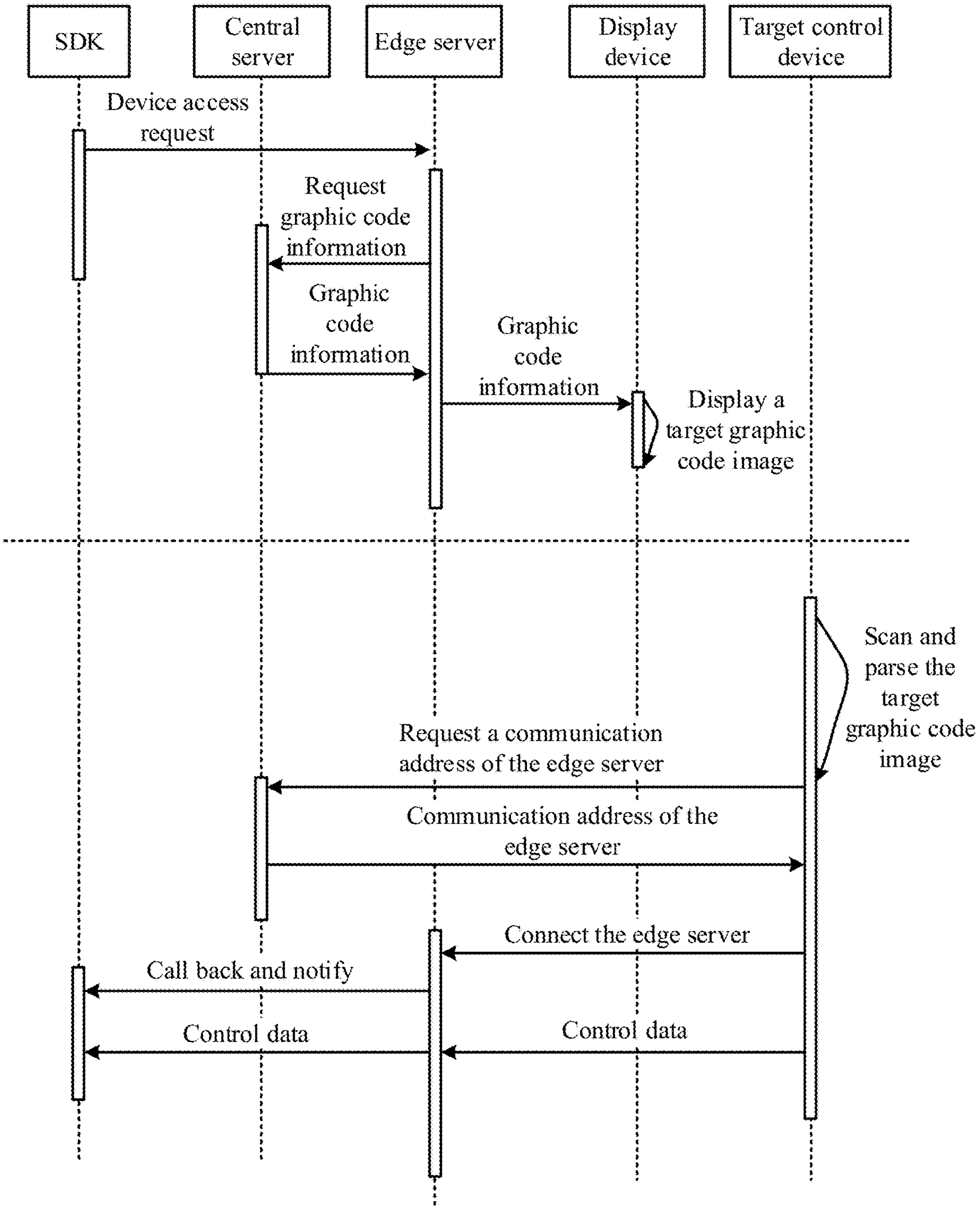
Figure 5C:
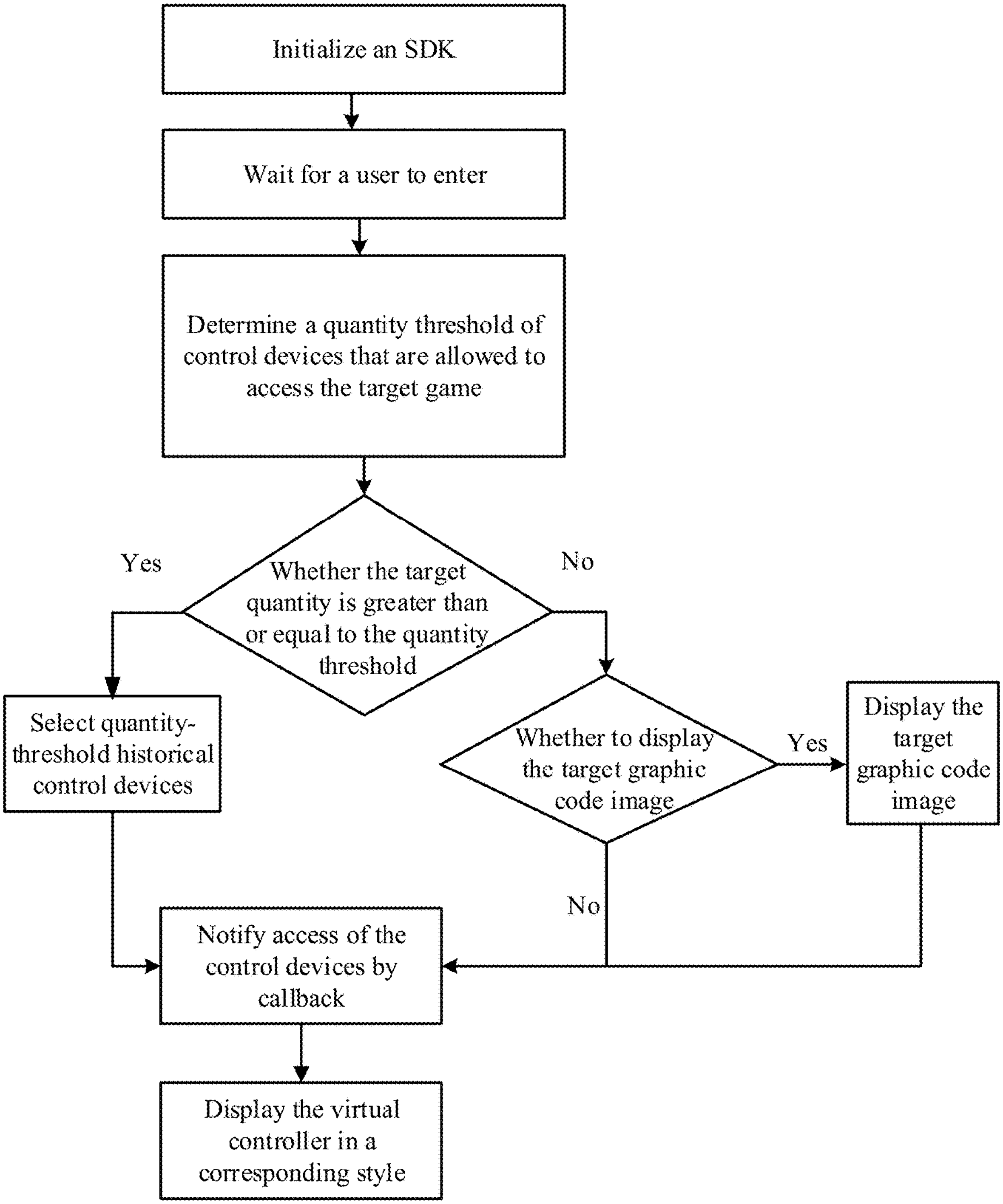
Figure 5D:
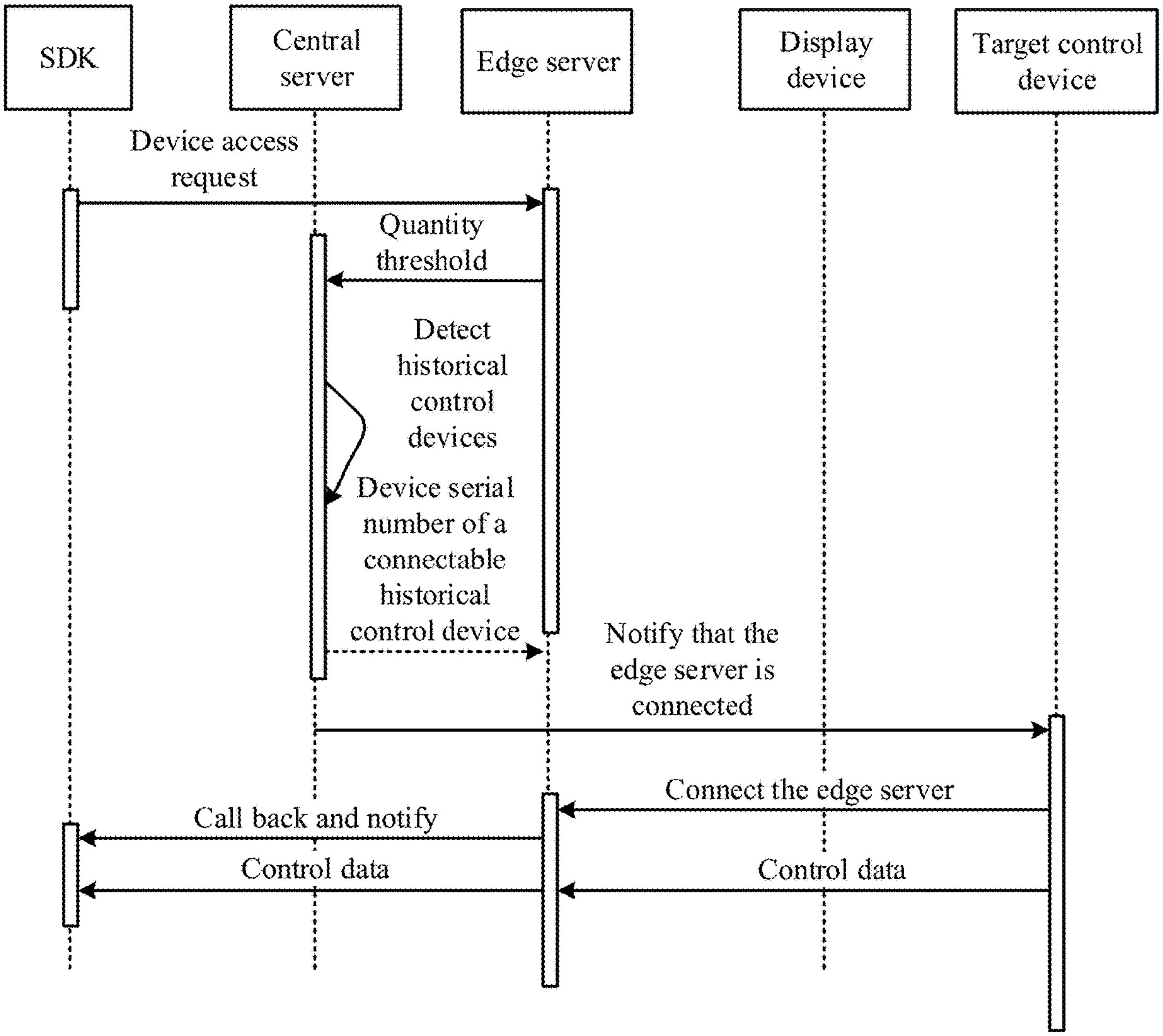
Figure 5E:
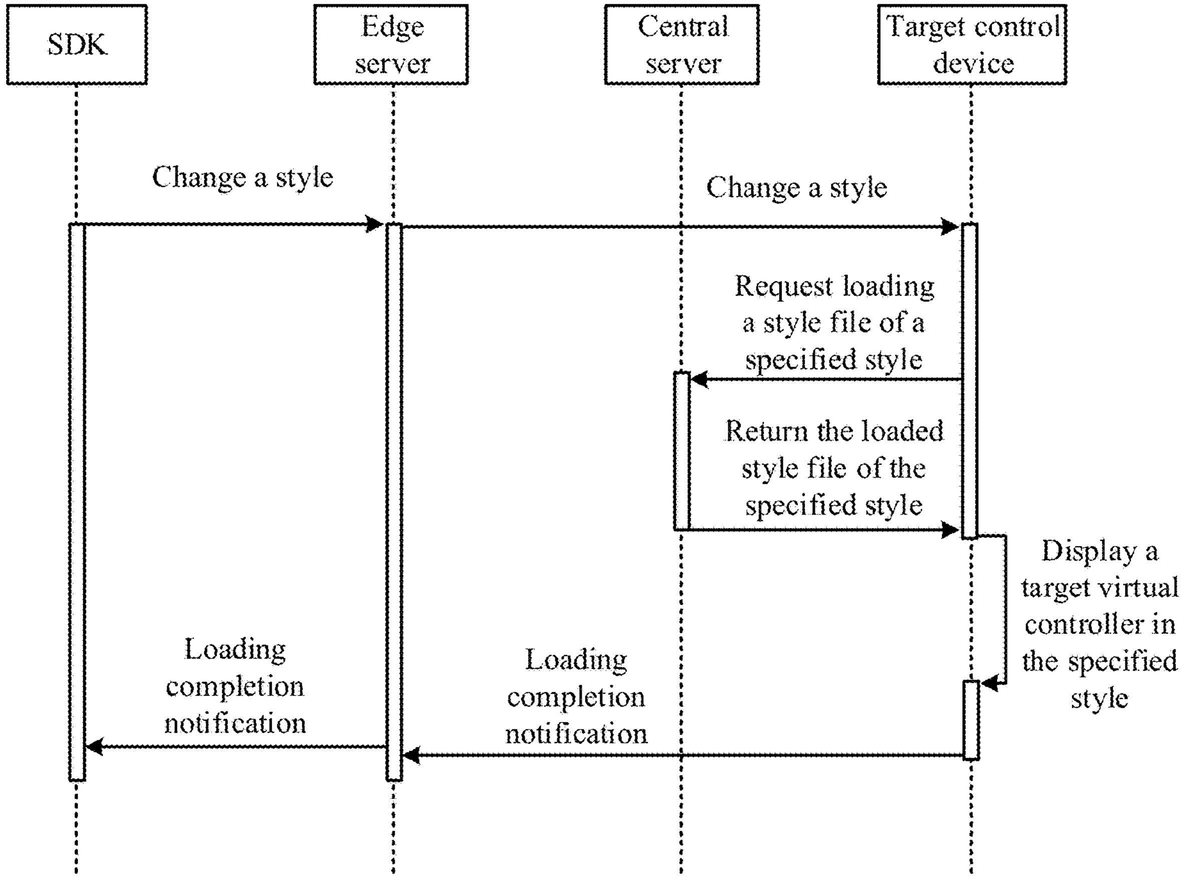
Figure 6:
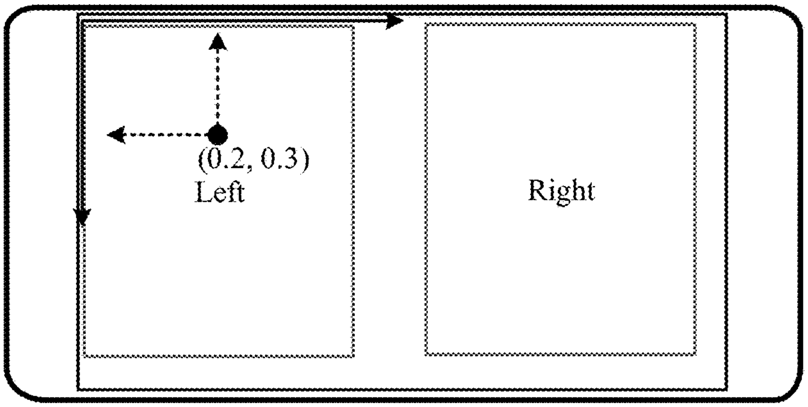
Figure 7:
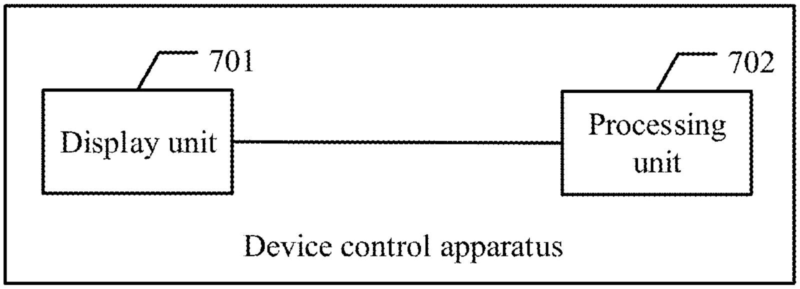
Figure 8:
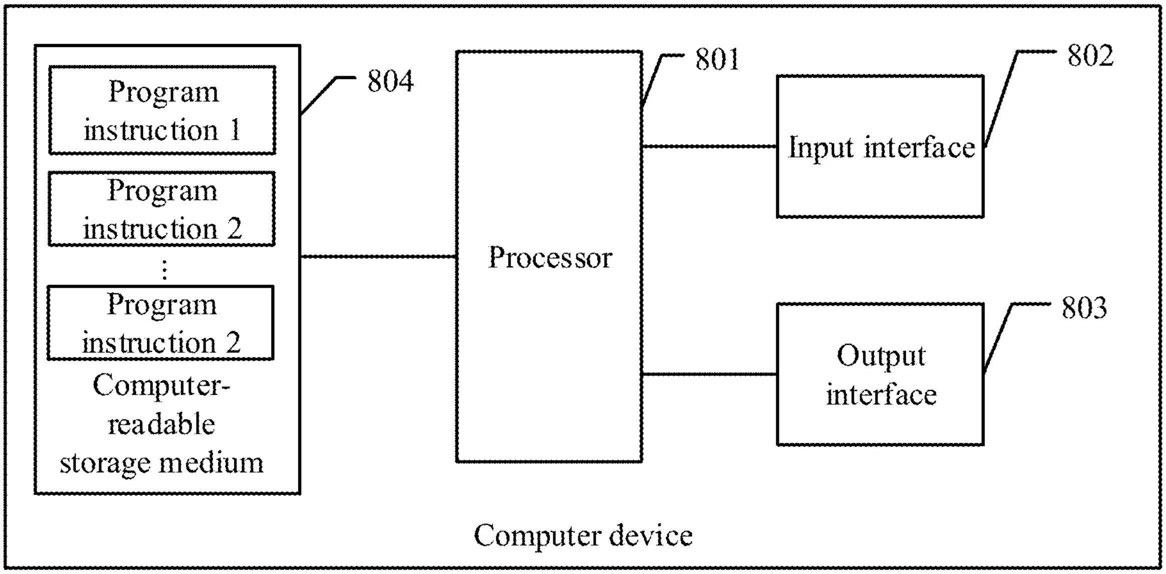

FIG. if is a diagram of a system architecture of a device control system according to another embodiment of the disclosure;

FIG. 2 is a schematic flowchart of a device control method according to an embodiment of the disclosure;

FIG. 3*a* shows an example use case of an update of a game screen in a display device according to an embodiment of the disclosure;

FIG. 3*b* shows another example use case of an update of a game screen in a display device according to an embodiment of the disclosure;

FIG. 3*c* shows an example use case of a vibration operation of a target control device according to an embodiment of the disclosure;

FIG. 3*d* shows an example use case of a target virtual controller and a cooperative virtual controller according to an embodiment of the disclosure;

FIG. 3*e* shows yet another example use case of an update of a game screen in a display device according to an embodiment of the disclosure;

FIG. 4*a* shows examples of a bar code and a two-dimensional code according to an embodiment of the disclosure;

FIG. 4*b* shows an example use case of a target control device scanning a target graphic code image according to an embodiment of the disclosure;

FIG. 4*c* is a schematic diagram of a control device in an available state according to an embodiment of the disclosure;

FIG. 4*d* is a schematic diagram of a control device in a standby state according to an embodiment of the disclosure;

FIG. 4*e* shows an example use case of a target graphic code image in a display device according to an embodiment of the disclosure;

FIG. 5*a* is a schematic diagram of a state relationship between game startup and user entry into a game according to an embodiment of the disclosure;

FIG. 5*b* is a schematic diagram of a principle of code scanning access according to an embodiment of the disclosure;

FIG. 5*c* is a schematic logical diagram of device access logic according to an embodiment of the disclosure;

FIG. 5*d* is a schematic diagram of a principle of non-code-scanning access according to an embodiment of the disclosure;

FIG. 5*e* is a schematic flowchart of a process of using a software development kit (SDK) according to an embodiment of the disclosure;

FIG. 6 is a schematic diagram of position coordinates of a black touch point according to an embodiment of the disclosure;

FIG. 7 is a schematic structural diagram of a device control apparatus according to an embodiment of the disclosure; and FIG. 8 is a schematic structural diagram of a computer device according to an embodiment of the disclosure.

DETAILED DESCRIPTION

Technical solutions in embodiments of the disclosure will be clearly and fully described below with reference to the accompanying drawings in the embodiments.

In the embodiments of the disclosure, games described hereinafter all refer to electronic games run by devices. Moreover, from the perspective of implementation conditions of the electronic games, the games described hereinafter may be standalone games or online games. The standalone games refer to: games that are locally completed on devices without any network. Correspondingly, the online games refer to: games that need to be jointly completed by user equipments and game servers relying on networks and can support a plurality of users to participate at the same time. From the perspective of operating carriers of the electronic games, the games described hereinafter may be client games, mobile games, webgames, cloud games, or the like. The client games refer to games run on personal computers (PCs). The mobile games refer to games run on mobile devices (such as mobile phones, tablet computers, and smart watches). The webgames refer to games run on webpages. The cloud games refer to games run on game servers.

In other words, the cloud games are not run on user equipments, but on game servers. The game servers may compress and encode game screens and game audio in the cloud games into media streams, and then transmit the media streams to the user equipments through networks for image display and audio playback. When users perform various operations in game interfaces, the user equipments may report operation data generated by the operations to the game servers, and the game servers refresh the game screens of the cloud games according to the operation data in the corresponding cloud games, and then return the refreshed game screens to the user equipments for display, so as to realize playing of the cloud games. As can be seen, the cloud games are based on a cloud computing technology. The cloud computing technology provides powerful graphics processing capabilities and data computing capabilities for the cloud games. Cloud computing is a computing mode that distributes computing tasks on a resource pool including a large number of computers, enabling various application systems to acquire computing power, storage space, and information services as required.

Figure 1A:
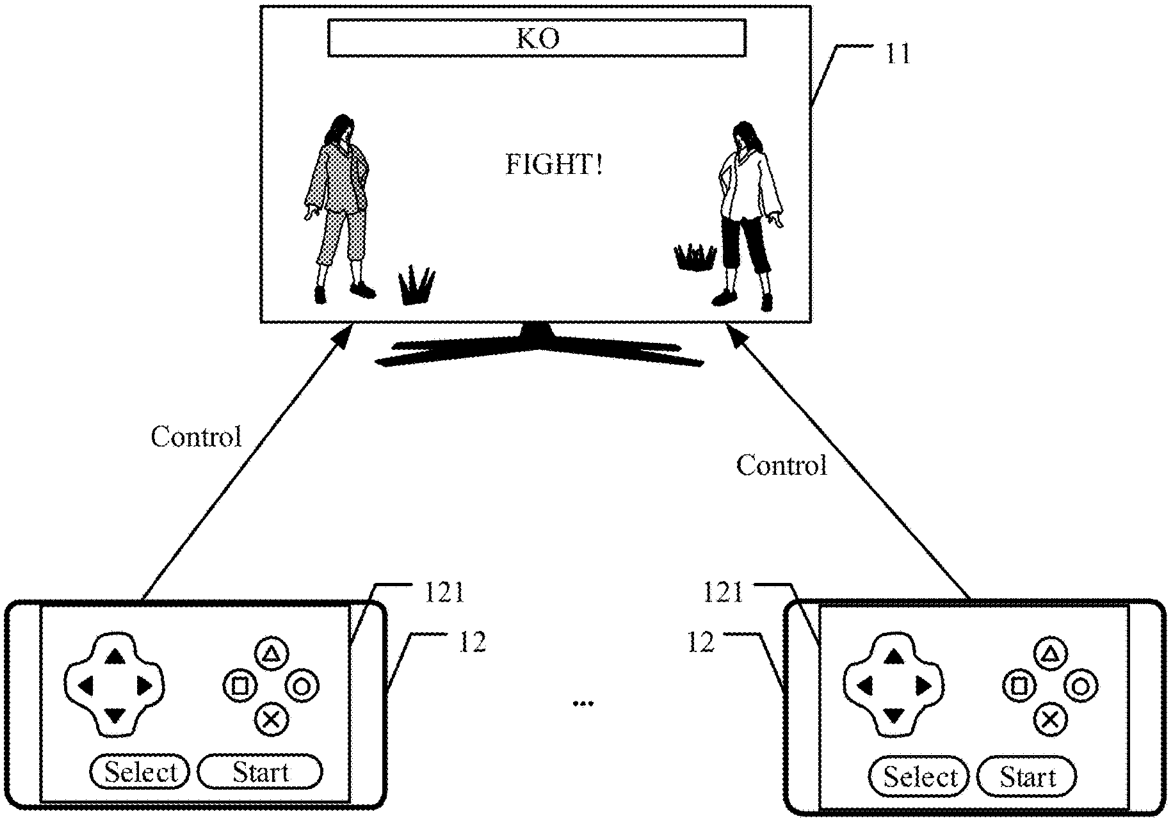
FIG. 1*a* is a schematic diagram of a virtual controller according to an embodiment of the disclosure.

In order to reduce operating resources consumed by the user equipments when running and controlling the games alone, an embodiment of the disclosure provides a device control scheme. Specifically, a general principle of the device control scheme, as shown in FIG. 1*a*, is as follows: For a target game, a game screen of the target game may be displayed through a display device 11. In addition, a virtual controller 121 configured to control the target game may be separately displayed through one or more control devices 12. A target virtual controller configured to control the target game is independently displayed by introducing a target control device, so that control over and display of the target game are separated from each other when the target game is controlled through the target virtual controller, which prevents blocking of the game screen of the target game due to control over a specified component on the game screen, so as to support the user to watch a complete game screen, and can further prevent problems of consumption of a large number of operating resources, degradation of operational performance, and shortening of the service life caused by joint display of the game screen and the specified component configured to control the game on a same user equipment. The virtual controller may be a controller displayed on a device screen and having a same control function as a physical controller (such as a physical keyboard or a physical gamepad). Styles of the virtual controller displayed in different control devices 12 may be the same or different, which is not limited. Herein, “a plurality of” means “at least two.”

Figure 1B:
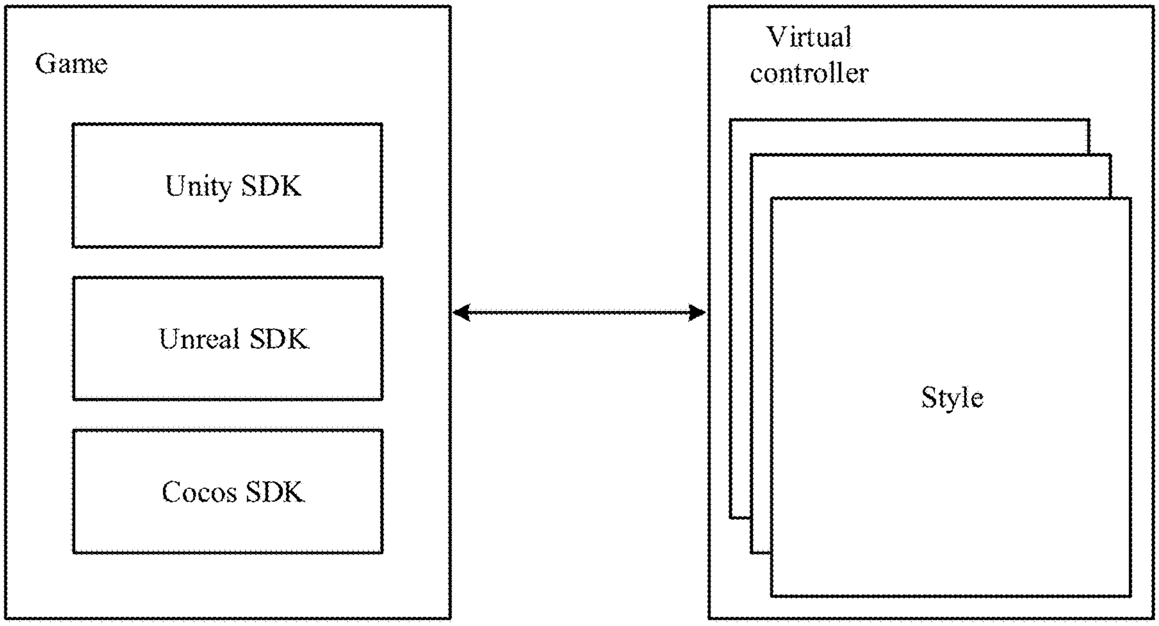
FIG. 1B is a schematic diagram of development of a plurality of styles of a virtual controller according to an embodiment of the disclosure.
Figure 1C:
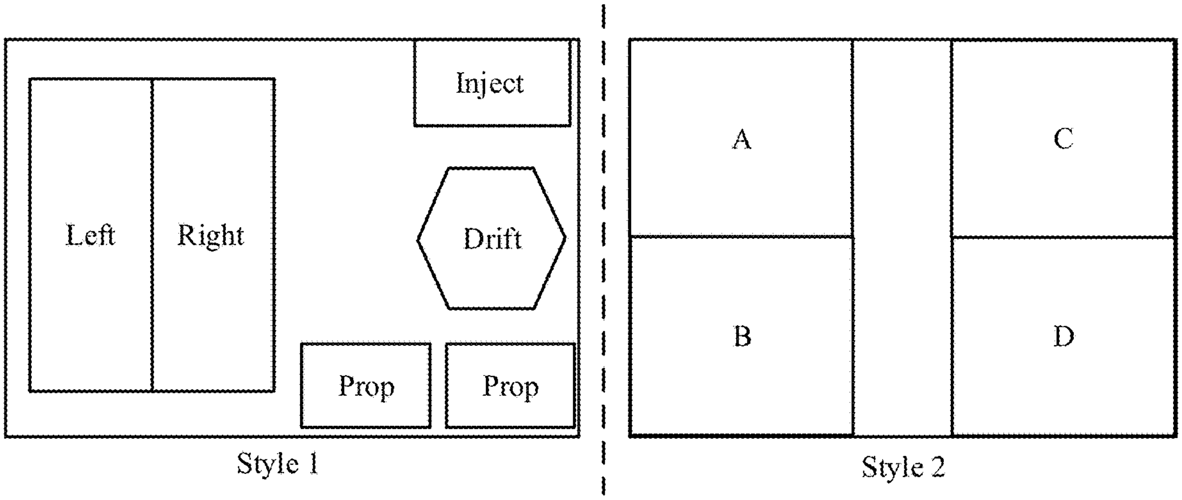
FIG. 1*c* shows an example plurality of styles of a virtual controller for a target game according to an embodiment of the disclosure.

Further, the virtual controller displayed in any control device may be provided for a game developer of the target game in the form of a software development kit (SDK) of the target game for style development, so that the game developer can customize and develop different styles of the virtual controller according to different game scenes of the target game, as shown in FIG. 1B. The SDK may be any type of SDK, such as a Unity SDK, an Unreal SDK, or a Cocos SDK. Unity, Unreal (UNREAL ENGINE), and Cocos are all game engines. Correspondingly, the game developer may develop an SDK that includes a plurality of styles of virtual controllers by hyper text markup language (HTML)+cascading style sheets (CSS). As shown in FIG. 1*c*, a plurality of styles of a virtual controller may be developed for the target game. Herein, the plurality of styles and related modules developed using an SDK will be referred to interchangeably with the SDK itself, at least portions of which are typically, though not necessarily, provided alongside the styles and modules for use in the game by players. After the game developer develops the styles through the SDK, the SDK may be integrated into an operating carrier of the target game, so that the target game has the following capabilities: The target game can support a plurality of users to use any mobile device with a display function and a touch function as a control device and to access the target game through the control device, so as to control the target game. The SDK may have, but is not limited to, the following functions:

1) a function of acquiring an operation event, which means that the SDK may acquire a user operation behavior of each control device, such as an operation behavior of component click-through and an operation behavior of component press;
2) a function of feeding back a user access event, which means that, after a user accesses the target game through the control device, the SDK may feedback user information (a nickname, an avatar, a device number, and the like) of the user to the target game;
3) a function of changing a style of the virtual controller, which means that the SDK may determine different styles of the virtual controller according to different game scenes of the target game, so as to notify the control device to display different styles of the virtual controller, facilitating the user to operate the game; and
4) a function of transmitting vibration and sound effects to the control device, which means that the SDK may transmit a prompt to the control device when there is a need to prompt the user, to prompt the user to use the control device, warn the user, or the like.

As can be seen, the game developer is provided with the SDK, and the game developer can use the SDK to customize different styles of the virtual controller according to different game scenes, so that, when the display device displays each game screen in the target game, the style of the virtual controller can be adjusted in each control device 12 according to a current game scene to which a current game screen displayed in the display device belongs. Therefore, the adjusted style of the virtual controller displayed in the control device 12 automatically fits the current game scene, enabling the user to use different styles of the virtual controller to control the target game in different game scenes to improve ease of control for the user to control the virtual controller, thereby improving user viscosity. The displayed adjusted style of the virtual controller automatically fits the current game scene, the user does not need to manually switch the style of the virtual controller through the control device, and the control device does not need to deal with redundant user operations, but merely responds to control operations triggered in the virtual controller fitting the current game scene, which reduces operating pressure of the control device. Moreover, the virtual controller fitting the current game scene also enables the user to control the current game scene in the target game through fewer operations, which reduces a number of times the control device responds to the user operations and reports operation data to the display device or server. Especially in a case that there are a plurality of control devices connected to the display device, for each control device, a quantity of data interactions between the control device and the display device can be reduced, so a refresh frequency and a response load of the display device can be greatly reduced.

The game scene refers to a certain game task action that occurs within a certain time and space, or a scene formed by an object relationship between various objects (the objects refer to virtual game characters) in the game. For example, when the target game is a fighting game, the target game may include a game lobby scene, a fighting scene, a performance scene, and the like. The game lobby scene refers to: a scene displaying a game screen of a game lobby of the target game. The game lobby refers to a virtual space in the game for performing operations such as an object selection operation and a game information viewing operation. The fighting scene refers to: a scene displaying a game screen in which any user (i.e., a game player) controls corresponding objects and objects used by other users in a game to engage in an actual combat. The performance scene refers to: a scene displaying a game screen in which the user performs a plot performance in a single game. For example, when the target game is a racing game, the target game may include a game lobby scene, a racing scene, a score settlement scene, and the like. The racing scene refers to: a scene displaying a game screen in which any user controls corresponding objects and objects used by other users in a game to engage in an actual racing competition. The score settlement scene refers to: a scene displaying a game screen in which the user's racing result is settled after the user finishes the competition.

Figure 1D:
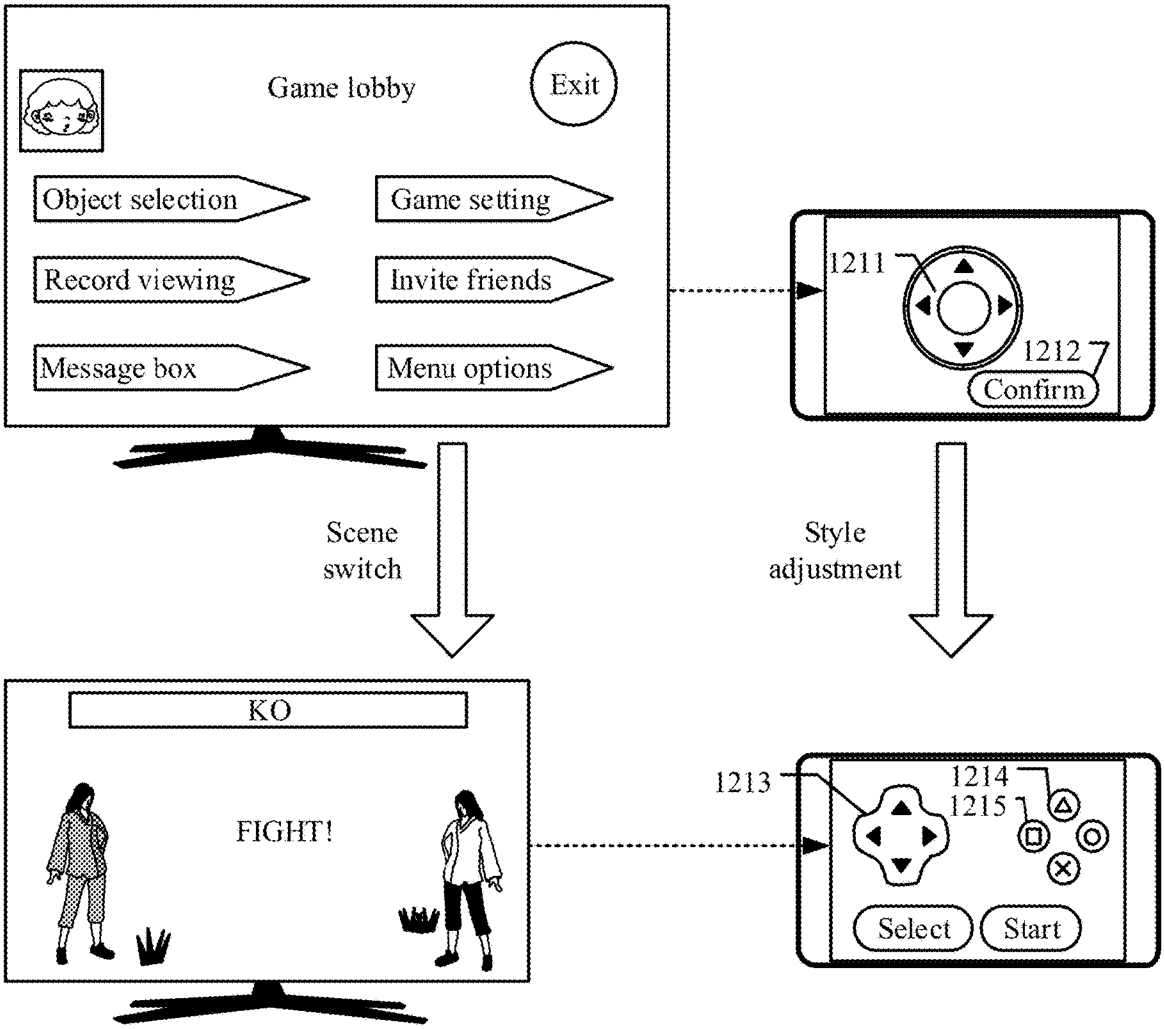
FIG. 1*d* shows an example use case of a change in style of a virtual controller as a scene switches according to an embodiment of the disclosure.

Taking the target game as the fighting game as an example, as shown in FIG. 1*d*, when the display device 11 displays the game screen in the game lobby scene of the target game, the control device 12 may display the virtual controller in a style fitting the game lobby scene. If the game lobby scene generally involves a game selection operation, a game information viewing operation, and the like, the virtual controller 121 in this case may include: a focus control component 1211 configured to control an input focus on the game screen, and a confirmation component 1212 that performs a confirmation operation. In the case of switching from the game lobby scene of the target game to the fighting scene, that is, when the display device 11 displays the game screen in the fighting scene of the target game, the control device 12 may display the virtual controller in a style fitting the fighting scene. If the fighting scene generally involves an object movement operation, an object jump operation, an object attack operation, and the like, the virtual controller 121 in this case may include: an object movement component 1213 configured to perform an object movement operation, an object jump component 1214 configured to perform an object jump operation, an object attack component 1215 configured to perform an object attack operation, and the like.

Figure 1E:
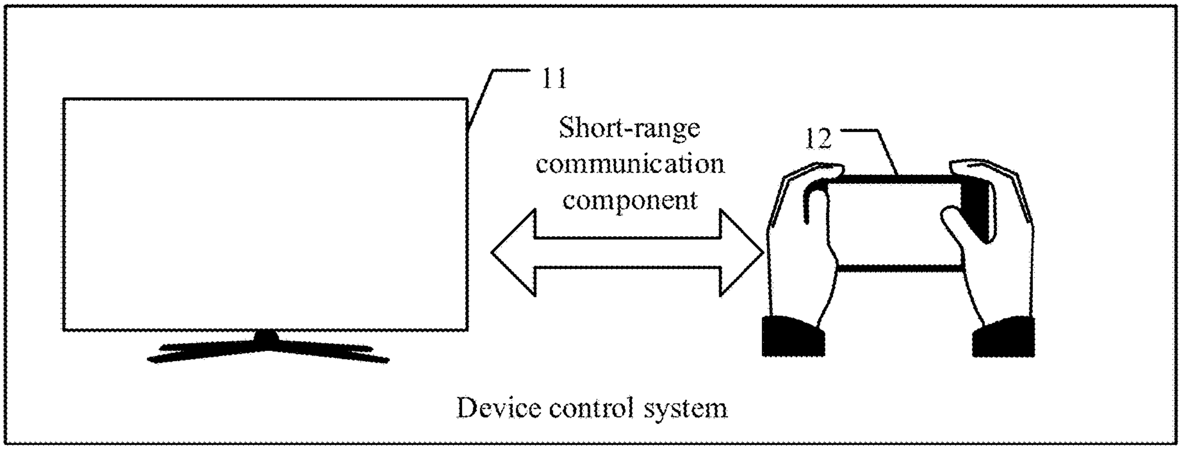
FIG. 1*e* is a diagram of a system architecture of a device control system according to an embodiment of the disclosure.

Based on the above device control scheme, an embodiment of the disclosure further provides a device control system adapted to realize the device control scheme. When the target game is a standalone game, the device control system may include: a display device 11 and one or more control devices 12. Moreover, as shown in FIG. 1*e*, the control devices 12 and the display device 11 may communicate through a wire or a short-range communication component. The short-range communication component refers to a component developed based on a near field communication (NFC) technology, such as a wireless fidelity (Wi-Fi) component, an NFC component, or a Bluetooth component. In the device control system, an operating carrier of the target game is the display device 11. That is, the SDK of the target game is integrated in the display device 11. Then, an implementation principle of the device control scheme may be as follows: The display device 11 may detect, through the SDK of the target game, whether there is a scene switch in the target game when the display device 11 displays the game screen of the target game. It may be determined that the style of the virtual controller needs to be changed if it is detected that there is a scene switch in the target game. In this case, the style of the virtual controller that each control device 12 needs to display can be determined according to the current game scene of the target game through the SDK of the target game, so as to notify the control device 12 to display the virtual controller according to the corresponding style.

When the target game is a cloud game, the device control system may also be called a cloud game system. The device control system may include at least: a display device 11, one or more control devices 12, and a game server 13. The game server 13 herein refers to a server configured to provide various game services (such as a data storage service and a game login service). The game server 13 may store a style file of various styles of virtual controllers through the data storage service. In the device control system, the display device 11 may be responsible for displaying the game screen, and is not responsible for running the target game, but the game server 13 is responsible for running the target game. Moreover, in the device control system, the operating carrier of the target game may be the game server 13, and the SDK of the target game may be integrated in the game server 13. Then, the implementation principle of the device control scheme is as follows: The game server 13 may compress and encode, in real time, the game screen and game audio in the target game into a media stream, and then transmit the media stream to the display device 11 through a network, and the display device 11 performs image display and audio playback according to the received media stream. The game server 13 may further detect, through the SDK of the target game, whether there is a scene switch in the target game when the display device 11 displays the game screen of the target game. It may be determined that the style of the virtual controller should be changed if it is detected that there is a scene switch in the target game. In this case, the style of the virtual controller that each control device 12 should display can be determined through the SDK of the target game according to the current game scene to which the current game screen displayed by the display device 11 belongs, so as to deliver a style file of the determined style to the control device 12, enabling the control device to display the virtual controller in the corresponding style according to the received style file.

Figure 1F:
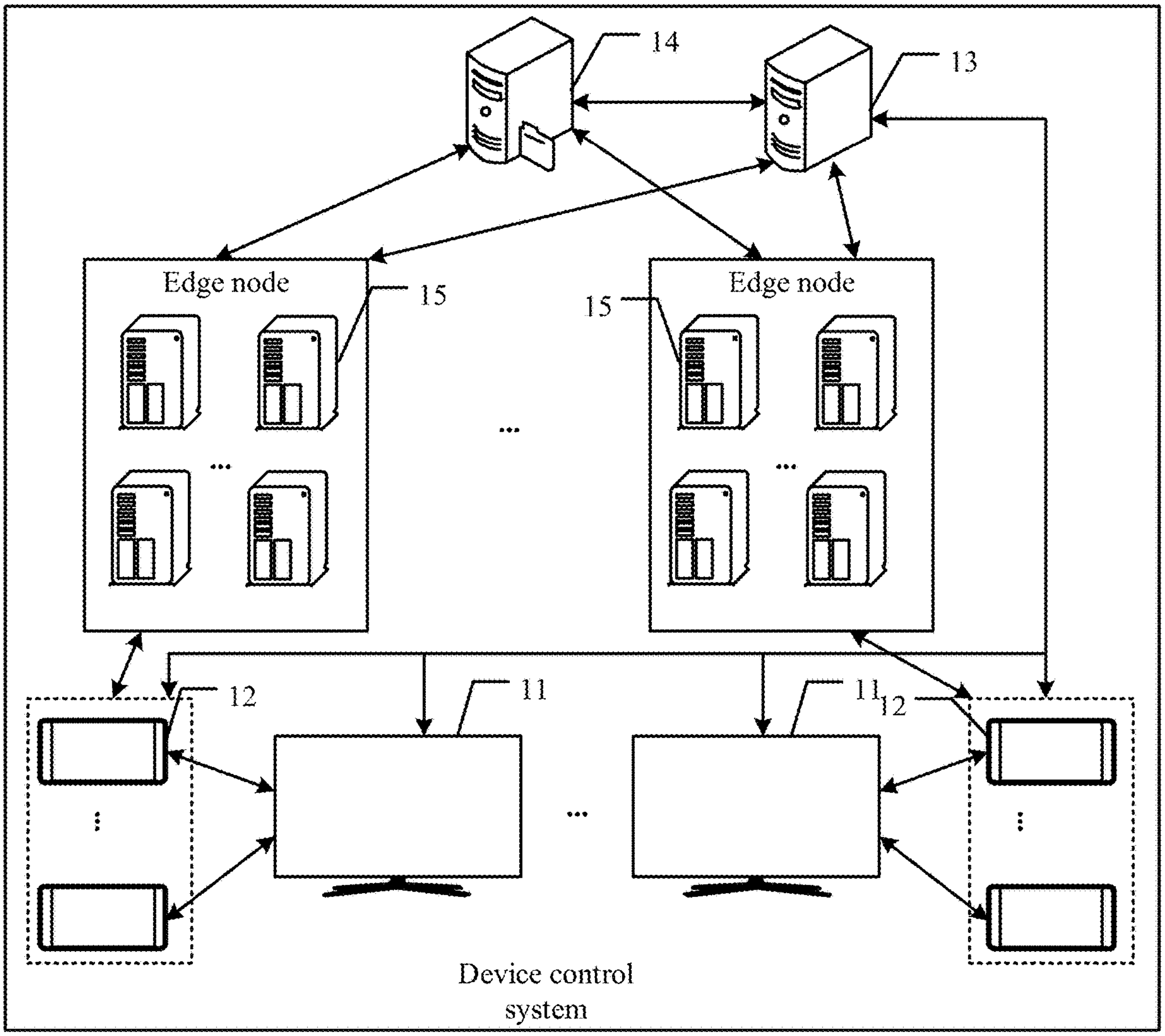

Optionally, the device control system (i.e., the cloud game system) may further include a central server 14 and one or more edge servers 15, as shown in another embodiment illustrated in FIG. 1*f*. The central server 14 refers to a server responsible for operations such as centrally controlling each edge server 15 and storing a style file of the virtual controller. The edge server 15 refers to a server deployed in an edge node. The edge node may be understood as a node close to the user (such as a computer room). Generally, delay-related data streams (such as audio and video data and control data) may be directly transmitted through the edge server 15 without passing through the central server 14. More edge nodes are deployed, so that each server of the cloud game can be as close as possible to the user, game data can be delivered, in a timely manner, to a device used by the user, thereby ensuring delayed experience of the user. Then, in the device control system (i.e., the cloud game system) shown in FIG. 1*f*, the implementation principle of the device control scheme is as follows:

The game server 13 may compress and encode, in real time, the game screen and game audio in the target game into a media stream, and then transmit the media stream to the display device 11 through a network, and the display device 11 performs image display and audio playback according to the received media stream. In addition, the game server 13 may detect, through the SDK of the target game, whether there is a scene switch in the target game. It may be determined that the style of the virtual controller should be changed if it is detected that there is a scene switch in the target game. In this case, the style of the virtual controller to be displayed can be determined through the SDK of the target game according to the current game scene to which the current game screen displayed by the display device 11 belongs, and a style identifier of the determined style is transmitted to each control device 12 through the edge server 15, so that the control device 12 can request the central server 14 to load a corresponding style file according to the received style identifier. Correspondingly, the central server 14 may respond to a request from each control device 12 and return the style file indicated by the style identifier to the control device 12, so that the control device 12 can display the virtual controller in the corresponding style based on the received style file.

Based on the above related description of the device control scheme and the related description of the device control system, the following points are described:

1) In the above related description of the device control scheme, the step of detecting whether a game scene is switched and the step of determining, according to the current game scene, the style of the virtual controller to be displayed are both performed by the operating carrier of the target game through the SDK of the target game, but may also be directly performed by the SDK of the target game. In addition, in another embodiment, a fitting relationship between the game scene and the style of the virtual controller may also be pre-configured to devices other than the operating carrier of the target game, so that the two steps can also be performed by the devices other than the operating carrier of the target game. For example, when the target game is a standalone game, the display device 11 may also directly transmit a scene identifier of the current game scene of the target game to each control device 12, and the control device 12 determines, according to the current game scene indicated by the scene identifier, the style of the virtual controller to be displayed, and displays the virtual controller in the determined style. In another example, when the target game is a cloud game, the game server 13 may also directly transmit a scene identifier of the current game scene of the target game to any one of the display device 11, the control device 12, the central server 14, and the edge server 15, so that the device receiving the scene identifier is responsible for performing the operation of determining, according to the current game scene of the target game, the style of the virtual controller that each control device 12 will display.
2) In the above related description of the device control system, the display device refers to any device with a display function, such as a smart TV, a tablet computer, a smart phone, a notebook computer, or a desktop computer. The control device refers to any mobile device with a display function and a touch function, such as a smart phone, a tablet computer, or a smart watch. As can be seen, according to the disclosure, through the development of the SDK, any mobile device can be used as a control device to realize game control, which does not require the user to use a specified physical handle and can effectively improve convenience of game control. In addition, various clients (applications (APPs)), such as a game client, a multimedia client, and a social client, may be run on both the display device and the control device. When the target game is a cloud game, the game client running on the display device is configured mainly to display the game screen of the target game, not to run the target game. Any server (such as the game server, the edge server, or the central server) as referred to above may be a standalone physical server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, a content delivery network (CDN), big data, and an artificial intelligence platform.

3) The device control system as referred to above may also be built based on a blockchain network. Specifically, all or part of the devices in the device control system may be deployed in the blockchain network. For example, the display device, the game server, the central server, the edge server, and the like in the device control system are deployed in the blockchain network. The device control system is built based on the blockchain network, so that, when any device in the device control system is deployed in the blockchain network or has a communication link with the blockchain network, the device can upload internal data to a blockchain of the blockchain network for storage, to prevent internal data of a computer device from being tampered with, thereby improving security of the internal data.

4) In the embodiments of the disclosure, a system architecture of the device control system provided in the embodiments is illustrated by example with two cases where the target game is a standalone game and where the target game is a cloud game as examples, which is not exhaustive. When the target game is an online game and the operating carrier is a mobile device or a PC, a system architecture of the device control system corresponding thereto is similar to the system architecture of the device control system involved in the cloud game. Details are not described herein again. In addition, FIG. 1*e* is only an exemplary representation of the device control system involved in the cloud game (i.e., the cloud game system), and does not limit the device control system. For example, the central server and the edge server in FIG. 1*e* are servers independent of each other. However, in another embodiment, the edge server 15 and the central server 14 in FIG. 1*e* may also be integrated into a server.

Based on the above related description of the device control scheme and the device control system, an embodiment of the disclosure provides a device control method. The device control method may be performed by a computer device. The computer device as referred to herein may be the display device, the target control device, the game server, the central server, or the edge server in the device control system as referred to hereinabove, which is not limited therein. The target control device refers to any one of one or more control devices accessing the target game. Alternatively, the device control method may also be jointly performed by all or part of the devices in the device control system as referred to hereinabove, for example, jointly performed by the display device and the target control device, jointly performed by the display device, the game server, and the target control device, and so on.

For ease of elaboration, the subsequent description is based on an example in which the computer device performs the device control method. Referring to FIG. 2, the device control method may include the following steps S201 to S204:

S201: Display, in a target control interface of a target control device in a process of a display device displaying a game screen in a first game scene of a target game, a target virtual controller in a first style fitting a first game scene.

From the perspective of implementation conditions of the electronic games, the target game may be a standalone game or an online game, which is not limited. From the perspective of operating carriers of the electronic games, the target game may be a cloud game, a mobile game, a client game, or a webpage game, which is not limited. The target game may have a plurality of game scenes successively arranged. The first game scene may be any game scene except the last game scene in the plurality of game scenes that the target game has, such as the first game scene or the second game scene.

In the process of the display device displaying the game screen in the first game scene of the target game, the computer device may determine, according to a pre-configured fitting relationship between scenes and styles or through the SDK of the target game, a first style fitting the first game scene. The first style refers to a style fitting the first game scene. Specifically, the first style fitting the first game scene may be determined through the SDK of the target game if the computer device is the operating carrier of the target game. The first style fitting the first game scene may be determined through the pre-configured fitting relationship between scenes and styles if the computer device is not the operating carrier of the target game.

The target game may include one or more objects. Any object may be independently controlled through a virtual controller displayed in a control device accessing the target game, or may be cooperatively controlled through virtual controllers displayed in one or more control devices accessing the target game, which is not limited. Styles of the virtual controller configured to control different objects may be the same or different when the target game includes a plurality of objects, which may be specifically configured according to an actual service requirement. If the target game includes a plurality of objects and the styles of the virtual controller configured to control different object in the first game scene are different from each other, the first style may be further determined in the following manner: first determining a plurality of styles fitting the first game scene, one style corresponding to one object; and then selecting, from the plurality of styles determined, a style corresponding to a target object as the first style. The target object refers to an object controlled through a target virtual controller. The target virtual controller refers to: a virtual controller displayed in the target control device.

After the first style is determined, the computer device may display the target virtual controller in the first style in the target control interface in the target control device. Specifically, if the computer device is the target control device, the computer device may directly acquire a style file of the first style, and display the target virtual controller in the first style based on the acquired style file of the first style. If the computer device is not the target control device, for example, the computer device is the display device, the game server, or the like, the computer device may transmit a style identifier of the first style to the target control device, and the target control device acquires a style file of the first style according to the style identifier of the first style, so as to display the target virtual controller in the first style based on the acquired style file of the first style. Alternatively, the computer device may first acquire a style file of the first style and then transmit the style file of the first style to the target control device, enabling the target control device to display the target virtual controller in the first style based on the received style file of the first style.

S202: Update, in the first game scene, the game screen in the first game scene displayed in the display device in a case that the target virtual controller in the first style is controlled.

In a specific implementation, the target virtual controller in the first style may include P first control components. One first control component corresponds to one game operation. P is a positive integer. A user of the target control device may trigger update of the game screen in the first game scene displayed in the display device by controlling one or more of the P first control components each time. Correspondingly, the computer device may update, in the first game scene, the game screen in the first game scene displayed in the display device in a case that the target virtual controller in the first style is controlled. Specifically, in a case that the target virtual controller in the first style is controlled, the computer device may determine the controlled first control component from the P first control components, and update a current game screen in the first game scene displayed in the display device according to a game operation corresponding to each controlled first control component. The current game screen in the first game scene as referred to herein refers to: the game screen displayed in the display device in a case that the target virtual controller in the first style is controlled.

For example, as shown in FIG. 3*a*, the target virtual controller in the first style may include the following first control components: a game start component 31, a role selection component 32, and the like. The game start component 31 corresponds to a game start operation, and the role selection component 32 corresponds to a role selection operation. It may be considered that the game start component 31 is controlled if the user of the target control device clicks on or presses the game start component 31. In this case, current game screen 33 is displayed in the display device in the first game scene. The computer device may display a game start screen 34 in the first scene of the target game in the display device according to the game start operation corresponding to the game start component 31, to update a current game screen 33 in the first game scene displayed in the display device.

In another example, as shown in FIG. 3*b*, the target virtual controller in the first style may include the following first control components: an injection component 35, a drift component, and the like. The injection component 35 corresponds to a game operation that may control a vehicle to perform an injection action, and the drift component corresponds to a game operation that may control the vehicle to perform a drift action. It may be considered that the injection component 35 is controlled if the user of the target control device clicks on or presses the injection component 35. In this case, the current game screen 36 is displayed in the display device in the first game scene. The computer device may display, in the display device according to the game operation corresponding to the injection component 35, a game screen 37 in which the vehicle performs the injection action, to update and display a current game screen 36.

S203: Display, in the target control interface in response to switching from the first game scene to a second game scene of the target game, the target virtual controller in a second style fitting the second game scene.

The second game scene may be any game scene different from the first game scene in the plurality of game scenes that the target game has. For example, the second game scene may be a game scene located behind the first game scene and adjacent to the first game scene in the plurality of game scenes that the target game has. Assuming that the first game scene is the second game scene in the plurality of game scenes, the second game scene may be the third game scene in the plurality of game scenes. In another example, the second game scene may be a game scene located before the first game scene and adjacent to the first game scene in the plurality of game scenes that the target game has. Assuming that the first game scene is the second game scene in the plurality of game scenes, the second game scene may be the first game scene in the plurality of game scenes. In another example, the second game scene may also be a game scene not adjacent to the first game scene in the plurality of game scenes that the target game has. Assuming that the first game scene is the second game scene in the plurality of game scenes, the second game scene may be the fourth game scene, the fifth game scene, the eighth game scene, or the like in the plurality of game scenes.

After detecting a scene switch event of switching from the first game scene to the second game scene of the target game, the computer device may determine, according to the pre-configured fitting relationship between scenes and styles or through the SDK of the target game, a second style fitting the second game scene. The second style refers to a style fitting the second game scene. Then, the computer device may display the target virtual controller in the second style in the target control interface in the target control device. A manner of determining the second style is similar to the above manner of determining the first style as described in step S201. Details are not described herein again. Similarly, a manner of displaying the target virtual controller in the second style is similar to the above manner of displaying the target virtual controller in the first style as described in step S201. Details are not described herein again.

S204: Update, in the second game scene, the game screen in the second game scene displayed in the display device in a case that the target virtual controller in the second style is controlled.

In a specific implementation, the target virtual controller in the second style may include Q second control components. One second control component corresponds to one game operation. Q is a positive integer. The user of the target control device may trigger update of the game screen in the second game scene displayed in the display device by controlling one or more of the Q second control components each time. Correspondingly, the computer device may update, in the second game scene, the game screen in the second game scene displayed in the display device in a case that the target virtual controller in the second style is controlled. Specifically, in a case that the target virtual controller in the second style is controlled, the computer device may determine the controlled second control component from the Q second control components, and update a current game screen in the second game scene displayed in the display device according to a game operation corresponding to each controlled second control component. The current game screen in the second game scene as referred to herein refers to: the game screen displayed in the display device in a case that the target virtual controller in the second style is controlled. A specific implementation of step S204 is similar to that of step S202. No further example is given herein for illustration.

In an optional implementation, if the target game includes at least a target object, the computer device may further detect whether there is a control prompt event about the target object. Therefore, the computer device controls the target control device to perform a prompt operation according to the control prompt event when there is the control prompt event about the target object. The prompt operation may include at least one of the following: a vibration operation and a multimedia data output operation. The multimedia data as referred to herein may include, but is not limited to, a game sound effect matching the control prompt event, a prompt animation matching the control prompt event, and the like. The target control device is generally held by a target user and is in the most direct contact with the target user. Therefore, by controlling the target control device to perform the prompt operation such as the vibration operation and the multimedia data output operation, the target user can perceive a prompt transmitted from the target control device in a timely and intuitive manner, improving prompt effectiveness of the control prompt event.

The control prompt event may include: an abnormal event generated by the target object in the process of controlling the target object through the target virtual controller; or an event in which there is a need to notify the user of the target control device to control the target object. For example, the abnormal event may be an event in which the target object collides with another object in the process of controlling the target object. In another example, the abnormal event may be an event in which the target object has a reduced hit point due to attack from another object in the process of controlling the target object. In yet another example, the abnormal event may be an event in which the target object successfully releases a specified game skill in the process of controlling the target object, and so on. For example, as shown in FIG. 3*c*, the abnormal event is the event in which the target object collides with another object. When a target object 38 collides with another object 39 in the process of controlling the target object 38 through the virtual controller displayed in the target control interface, the computer device may control the target control device to perform the vibration operation.

The computer device may specifically control the target control device to perform the vibration operation according to the control prompt event in the following manner: The computer device may first acquire a target vibration frequency according to the control prompt event. Specifically, if the control prompt event includes: the event in which there is a need to notify the user of the target control device to control the target object, the computer device may acquire a first vibration frequency as the target vibration frequency. If the control prompt event includes: the abnormal event generated by the target object in the process of controlling the target object through the target virtual controller, the computer device may acquire a second vibration frequency as the target vibration frequency. The first vibration frequency and the second vibration frequency as referred to herein may be two different vibration frequencies preset according to service requirements. By configuring different vibration frequencies for different control prompt events, when the target control device subsequently performs vibration processing based on the target vibration frequency, the target user can intuitively perceive the control prompt event through a specific vibration frequency, which improves effectiveness of the prompt operation.

Optionally, when the control prompt event includes the abnormal event, the computer device may further acquire a frequency determination strategy fitting the abnormal event, and determine the target vibration frequency according to the frequency determination strategy and event information of the abnormal event. For example, when the abnormal event is: the event in which the target object collides with another object in the process of controlling the target object, the event information of the abnormal event may include: an impact force at which the target object collides with the another object. Then, the fitting frequency determination strategy may be used for indicating: determining the target vibration frequency according to the impact force in the event information according to a principle that the impact force is positively correlated with the vibration frequency. In another example, when the abnormal event is: the event in which the target object has a reduced hit point due to attack from another object in the process of controlling the target object, the event information of the abnormal event may include: an amount of reduction in the hit point of the target object. The amount of reduction in the hit point refers to: a difference between hit points of the target object before and after attack from the another object. Then, the fitting frequency determination strategy may be used for indicating: determining the target vibration frequency according to the amount of reduction in the hit point in the event information according to a principle that the amount of reduction in the hit point is positively correlated with the vibration frequency. If the target vibration frequency is determined in this implementation, when the target control device subsequently performs vibration processing based on the target vibration frequency, the target user can intuitively perceive an abnormal event through a specific vibration frequency, which improves effectiveness of the prompt operation.

The computer device, after determining the target vibration frequency in the above manner, may transmit the target vibration frequency to the target control device to enable the target control device to call an internal vibrator (such as a vibration motor) to perform vibration processing based on the target vibration frequency. Specifically, the target control device may use the target vibration frequency as a fixed vibration frequency, and call a vibrator to perform vibration processing according to the fixed vibration frequency. Alternatively, the target control device may count a current vibration duration in real time or periodically. The current vibration duration refers to: a difference between a system moment at which a duration will be counted and a start moment at which the target control device calls the vibrator to perform vibration processing. Next, a frequency increase range corresponding to the current vibration duration may be used as a target frequency increase range according to a correspondence of positive correlation between vibration durations and frequency increase ranges. Then, the target vibration frequency may be dynamically increased based on the target frequency increase range, to obtain a dynamic vibration frequency. For example, if the target frequency increase range is 10% and the target vibration frequency is 150, the dynamic vibration frequency is 150*10%+150=165. Finally, the computer device may call the vibrator to perform vibration processing according to the dynamic vibration frequency. In this implementation, a vibration frequency of the target control device may increase as a vibration duration of the target control device increases, so that the target user can more easily perceive a prompt signal transmitted by the target control device, improving effectiveness of prompt.

The computer device may specifically control the target control device to play back multimedia data according to the control prompt event in the following manner: The computer device may first determine, according to a matching relationship between events and multimedia data, multimedia data matching the control prompt event; and then control the target control device to play back the determined multimedia data. Specifically, a manner in which the computer device controls the target control device to play back the determined multimedia data may include any one of the following:

1) The target control device may pre-store a plurality of pieces of multimedia data in a local space, and then the computer device may transmit a data identifier of the determined multimedia data to the target control device, enabling the target control device to play back the corresponding multimedia data according to the received data identifier. In this manner, an amount of data transmission between the computer device and the target control device can be effectively reduced, thereby saving data transmission time, so that the target control device can play back the multimedia data in time.
2) The computer device may pre-store the determined multimedia data, and then the computer device may directly transmit the determined multimedia data to the target control device, enabling the target control device to directly play back the received multimedia data after receiving the multimedia data transmitted by the computer device. In this manner, there is no need to pre-store multimedia data in the target control device, which can effectively reduce occupation of storage of the target control device, thereby improving operating performance of the target control device.
3) The edge server may pre-store a plurality of pieces of multimedia data, and then the computer device may transmit a data identifier of the determined multimedia data to the target control device, so that the target control device can request the edge server based on the received data identifier to deliver the corresponding multimedia data and, after receiving the multimedia data delivered by the edge server, play back the multimedia data. In this manner, the multimedia data is stored into the edge server, which can effectively reduce occupation of storage of the target control device and improve the operating performance of the target control device. In addition, the edge server is physically located close to the target control device. Therefore, the acquisition of the multimedia data from the edge server can reduce a data transmission distance, thereby reducing the data transmission time, so that the target control device can faster receive the multimedia data, which improves playback efficiency of the multimedia data. Further, it is possible to transmit only the data identifier between the computer device and the target control device. Therefore, the amount of data transmission between the computer device and the target control device can also be effectively reduced, thereby saving the data transmission time, so that the target control device can acquire the data identifier in time and then acquire the multimedia data in time based on the data identifier, which improves the playback efficiency of the multimedia data.

In the above related description of controlling the target control device to perform a prompt operation, the computer device and the target control device may be different devices or a same device. When the computer device and the target control device are the same device, it may be understood that the target control device performs operations such as acquiring the target vibration frequency and determining and acquiring the multimedia data.

In another optional implementation, as can be seen from the foregoing, any object in the target game may be independently controlled through a virtual controller in one control device or cooperatively controlled through virtual controllers in one or more control devices. Then, when the target object in the target game is cooperatively controlled through virtual controllers in a plurality of control devices, the target virtual controller may also have a cooperative virtual controller. The cooperative virtual controller is displayed in a different control device than the target control device. The cooperative virtual controller refers to: a virtual controller configured to control the target object in cooperation with the target virtual controller. In a same game scene, a style of the cooperative virtual controller may be different from or the same as that of the target virtual controller.

For example, it is assumed that the target object may be cooperatively controlled by the target virtual controller and a cooperative virtual controller. Moreover, in a racing game scene of the target game, a user of the target virtual controller is configured to control a direction of the target object, and a user of the cooperative virtual controller is configured to control props of the target object and actions such as vehicle injection and vehicle drift. Then, the style of the target virtual controller and the style of the cooperative virtual controller may be shown in FIG. 3*d*. Referring to FIG. 3*d*, the target virtual controller may include a direction component (such as a left shift component and a right shift component) configured to control a direction of movement of the target object. The cooperative virtual controller may include: one or more prop components, an injection component, and a drift component.

Further, when the target virtual controller has the cooperative virtual controller, if the target virtual controller and the cooperative virtual controller are controlled at the same time, a target game action that the target object needs to perform may be determined according to a controlled control component in the target virtual controller and a controlled control component in the cooperative virtual controller, so as to display, in the display device, a game screen including the target object performing the target game action to update a current game screen displayed in the display device. For example, following the target virtual controller and the cooperative virtual controller shown in FIG. 3*d*, the injection component in the cooperative virtual controller is controlled while the left shift component in the target virtual controller is controlled, so it may be determined that the target object needs to perform a target game action of left shift and vehicle injection. In this case, a game screen in which the target object performs the target game action may be displayed in the display device, as shown in FIG. 3*e*.

The above method embodiment shown in FIG. 2 is only described by taking the first game scene and the second game scene in the target game as an example. In an actual application, when the display device displays a game screen of any game scene in the target game, the target virtual controller may be displayed on the target control device in a style fitting the game scene. Moreover, the target control device accesses the target game before displaying the target virtual controller in any style. That is, after accessing the target game, the target control device displays the target virtual controller in styles fitting game scenes of the target game.

In the first specific implementation, the target control device may access the target game in the following manner: displaying, in the display device, a target graphic code image for accessing the target game after the target game is started, to enable the target control device to access the target game by scanning the target graphic code image. The target graphic code image refers to: an image including a target graphic code for accessing the target game. The graphic code as referred to in the embodiments of the disclosure may be a bar code or a two-dimensional code. The bar code is a graphic identifier obtained by arranging a plurality of black bars and blanks having different widths according to an encoding rule and used for expressing a set of information, as shown in the left panel of FIG. 4*a*. The two-dimensional code is a graphic identifier obtained by distributing a particular geometric figure on a two-dimensional plane according to a rule, checkered with black and white, and used for recording data symbol information, as shown in the right panel of FIG. 4*a*. For example, an example use case of a target control device scanning a two-dimensional code, and to thereby access the target game, is shown in FIG. 4*b*.

If the target game is a cloud game in a cloud game system, as can be seen from the foregoing, the cloud game system includes a central server and an edge server. Then, the target graphic code image may include: a communication address of the central server and a graphic code identifier (such as a two-dimensional code identifier or a bar code identifier). The graphic code identifier is associated with a communication address of the edge server. Then, the target control device accesses the target game by scanning the target graphic code image in the following manner: The target control device scans the target graphic code image, and parses the scanned target graphic code image to obtain the communication address of the central server and the graphic code identifier. Next, the target control device may establish a central communication link with the central server based on the communication address of the central server. Then, an address acquisition request carrying the graphic code identifier may be generated, and the address acquisition request is transmitted to the central server based on the central communication link to request the central server to return the communication address of the edge server according to the graphic code identifier. The target control device may establish an edge communication link with the edge server based on the communication address of the edge server after the communication address of the edge server is received. Moreover, it is determined that the target control device accesses the target game after the edge communication link is successfully established.

As can be seen, two links may be involved in the cloud game system: the edge communication link and the central communication link. The edge communication link essentially refers to: a communication connection between a control device and the edge server, and is mainly used for transmitting real-time information, including touch data, component click-through data for a virtual controller, and sensor data, data notifying the control device to perform a vibration operation, multimedia event data notifying the control device to play back multimedia data, an event of changing a style of a virtual controller displayed in the control device, and so on. The central communication link essentially refers to: a communication connection between a control device and the central server. Due to the existence of the central communication link, mainly due to a reason that the access of the control device is based on an entire life cycle of an entire target client from On to Off, the central communication link is mainly used for notifying the control device to display a default style, providing a style file of the style of the virtual controller that the control device will replace, notifying the control device to access the edge server, and other information. It is to be understood that, once any control device accesses the cloud game, two states may exist: One of the states is an available state. The available state is shown in FIG. 4*c*, and refers to a state of establishing the central communication link with the central server and establishing the edge communication link with the edge server. The other state is a standby state. The standby state is shown in FIG. 4*d*, and refers to a state of establishing a communication connection only with the central server. A control device in the standby state may wait for the user to enter a game before establishing the edge communication link with the edge server.

If the target game is a game other than the cloud game, for example, a mobile game, a client game, or a webgame in the online games, the target graphic code image may include: a communication address of the game server. Then, the target control device accesses the target game by scanning the target graphic code image in the following manner: The target control device scans the target graphic code image, and parses the scanned target graphic code image to obtain the communication address of the game server. Next, the target control device may establish a communication link with the game server based on the communication address of the game server. Moreover, it is determined that the target control device accesses the target game after the communication link is successfully established. Optionally, if the target game is an online game other than the cloud game and a device control system where the target game is located includes a central server and an edge server, the target graphic code image may also include: a communication address of the central server and a graphic code identifier.

If the target game is a standalone game, the target graphic code image may include a component identifier of a short-range communication component of the display device. Then, the target control device accesses the target game by scanning the target graphic code image in the following manner: The target control device scans the target graphic code image, and parses the scanned target graphic code image to obtain the component identifier of the short-range communication component in the display device. Then, the target control device may perform, based on the component identifier obtained by parsing, a component search in a physical environment where the target control device is located, and after successfully finding the corresponding short-range communication component, call a short-range communication component in the target control device and the found short-range communication component to establish a short-range communication connection. It is determined that the target control device accesses the target game after the short-range communication connection is successfully established.

In the second specific implementation, if the display device displays game screens of N games through a target client, any user may access any one of the N games through any control device to control the game. In this case, according to the embodiments of the disclosure, the access of any control device may be based on an entire life cycle of the target client from On to Off, not for an operation period of a single game. In other words, after any user accesses any one of the N games through any control device, if the user closes the game and starts another game, the control device may directly access the started another game without performing an operation of scanning a graphic code to access the another game. N is an integer greater than 1, and the N games include a target game. The target client refers to any client with a screen display function, such as a game client configured to display game screens of one or more cloud games or a browser client configured to display game screens of one or more webgames.

Based on this, the target control device may access the target game in the following manner: The computer device may display, in the display device in response to the target game being one of the N games that is first started, a target graphic code image for accessing the target game after the target game is started, to enable the target control device to access the target game by scanning the target graphic code image. The computer device may determine historical control devices that have accessed the target client in response to the target game being one of the N games that is not first started. The historical control devices refer to control devices accessing the target client before the target game is started. The historical control devices access the target client by accessing any one of the N games that is started before the target game. Moreover, each of the historical control devices continues to access the target client after the accessed game is closed, until the target client ends operation.

Then, the computer device may count a target quantity of the determined historical control devices (a number which may be indicated as "H"), and determine a quantity threshold of control devices that are allowed to access the target game (a number which may be indicated as "T"). The target game may include a plurality of game scenes, and a quantity of control devices required may be pre-configured for each of the game scenes. Then, the quantity threshold of the control devices that are allowed to access the target game may be determined in the following specific implementation: determining quantities of control devices required for the game scenes of the target game, and using a determined maximum quantity as the quantity threshold of the control devices that are allowed to access the target game. For example, it is assumed that the target game has a total of three game scenes, and quantities of control devices required for the game scenes are sequentially: one, four, and three. Then, it may be determined that the quantity threshold of the control devices that are allowed to access the target game is four.

The computer device may select T historical control devices from the target quantity of historical control devices in a case that the target quantity is greater than the quantity threshold. (That is, for example, if T=4, the computer device may select four historical control devices.) Specifically, the computer device may control access moments at which the target quantity of historical control devices access the target client, and select T historical control devices from the target quantity of historical control devices in ascending order of the access moments. The computer device may transmit an access prompt to each of the target quantity of historical control devices, and select the T historical control devices from the target quantity of historical control devices in order in which the historical control devices return confirmation information about the access prompt. It is to be understood that only the specific implementation of how to select the T historical control devices is exemplarily elaborated in the embodiments of the disclosure, which is not exhaustive. After selecting the T historical control devices, the computer device may notify the selected historical control devices to access the target game. In this case, the target control device is one of the selected historical control devices. In this manner, when the target user switches from another game to the target game, if there are historical control devices that meet the quantity threshold, there is no need for the target user to perform the code scanning operation again, which has high convenience and improves efficiency of access to the game.

The computer device may notify the historical control devices that have accessed the target client to access the target game in a case that the target quantity (H) is less than or equal to the quantity threshold (T). In addition, the computer device may further display, in the display device, a target graphic code image for accessing the target game, to enable additional control devices to access the target game by scanning the target graphic code image. The additional control devices may include: one or more control devices in all control devices in a same physical environment as the display device other than the historical control devices that have accessed the target client. In this case, the target control device can be either of one of the historical control devices that have accessed the target client, or one of the additional control devices.

Based on the above description, the following points are described:

1) In the above process, the computer device may select immediately displaying the target graphic code image in the display device to enable the other control devices to access the target game in a case that the target quantity is less than the quantity threshold. Alternatively, the computer device may select displaying the target graphic code image in the display device in a desired game scene to enable the other control devices to access the target game. Based on this, the computer device may further determine a reference quantity of control devices required for a target game scene of the target game (a number which may be indicated as "R1") in a case that the target quantity is less than the quantity threshold. The target game scene refers to: a game scene in response to detecting that the target quantity is less than the quantity threshold. The operation of displaying, in the display device, a target graphic code image for accessing the target game, to enable other control devices to access the target game by scanning the target graphic code image is performed in a case that the target quantity is less than the reference quantity. Switching of the game scene of the target game to an additional game scene, if requested by user interaction or other action of the game, may be delayed in a case that the target quantity is greater than or equal to the reference quantity, and the operation of displaying, in the display device, the target graphic code image for accessing the target game, to enable other control devices to access the target game by scanning the target graphic code image is performed in a case that a quantity of control devices required for the additional game scene (a number which may be indicated as "R2") is greater than the target quantity.

For example, assuming that the target quantity (H) of historical control devices that have accessed the target client determined by the computer device is two and the quantity threshold of control devices (T) that are allowed to access the target game is three, it may be determined that the target quantity is less than the quantity threshold. Further, if the target game scene of the target game is a game lobby scene, generally, only one user is required to control the target game in a game lobby, so the reference quantity (R1) of control devices required for the game lobby scene is one. That is, the target quantity in this case is greater than the reference quantity. If the switched game scene is a fighting scene which needs to involve four users, the reference quantity (R2) of control devices required for the fighting scene is four. That is, the target quantity in this case is less than the new reference quantity, so, after the switching to the fighting scene, the target graphic code image for accessing the target game can be displayed in the display device, enabling other control devices to access the target game by scanning the target graphic code image, as shown in FIG. 4*e*.

2) In the above process, a specific implementation of "displaying, in the display device, the target graphic code image for accessing the target game" may be: calculating, according to a quantity of control devices that have accessed the target game and a quantity of accessed control devices required for the target game, an image quantity of target graphic code images for accessing the target game (a number which may be indicated as "I"); and then displaying I target graphic code images in the display device. One target graphic code image corresponds to a corresponding one object in the target game. An object (i.e., the target object) controlled through the target control device is an object corresponding to the target graphic code image and scanned by the target control device. It is to be understood that objects corresponding to the target graphic code images are different from each other if each object in the target game is independently controlled by a virtual controller. Objects corresponding to at least two of the target graphic code images may be the same if there are one or more objects in the target game that need to be cooperatively controlled through a plurality of virtual controllers. For example, if the target object is cooperatively controlled by the target virtual controller and a cooperative virtual controller, both objects indicated by two of the target graphic code images are the target object.

Optionally, another specific implementation of "displaying, in the display device, the target graphic code image for accessing the target game" may be: displaying a target graphic code image in the display device without considering the quantity of control devices that have accessed the target game and the quantity of accessed control devices required for the target game. In this implementation, the control devices can be assigned corresponding objects in order in which the control devices scan the target graphic code image. In other words, an object controlled by the target virtual controller in this implementation is determined in order in which the target control device scans the target graphic code image. If the target device is the third to scan the target graphic code image, the object controlled by the target virtual controller may be the third object in the target game. Alternatively, after any control device scans the target graphic code image, an object selection interface may be outputted in the control device. The object selection interface may include one or more selectable objects, and then an object selected in the object selection interface is used as the object controlled by the virtual controller and displayed in the control device. In other words, the object controlled by the target virtual controller in this implementation is an object selected in the object selection interface by the user of the target control device.

3) In the above process, if the target game is a cloud game in a cloud game system, as can be seen from the foregoing, the cloud game system includes a central server and an edge server. In this case, after accessing a corresponding game, each historical control device maintains a central communication link with the central server and an edge communication link with the edge server; and disconnects the edge communication link with the edge server after the accessed game is closed. Correspondingly, any one of the historical control devices is notified to access the target game in the following manner: transmitting a server connection notification to the historical control device through the central server to notify the historical control device to re-establish the edge communication link with the edge server based on a communication address of the edge server.

4) In the above process, description is based on an example in which a graphic code image is a game access element. In another embodiment, a control device may also access the game by using another game access element. For example, a matching code including one or more elements of numbers, punctuation marks, and emojis may be used as the game access element. Specifically, a matching code may be displayed in the display device, and then the user may enter the same matching code in the control device to realize access of the control device to the target game.

5) Further, during the operation of the target game, a situation where the user of the target control device actively exits the target game through the target control device may occur, or a situation where the target control device passively exits the target game may occur due to a poor network environment (such as network congestion or a poor network signal) of the target control device. Based on this, in the embodiments of the disclosure, an exit event in which the target control device exits the target game may also be detected. An exit manner in which the target control device exits the target game is identified in response to detecting an exit event in which the target control device exits the target game. The exit manner includes an active exit manner or a passive exit manner. The target graphic code image may be displayed in the display device in a case that the exit manner is the active exit manner, so that control devices in all the control devices in the same physical environment as the display device other than the target control device access the target game by scanning the target graphic code image. The target graphic code image may be displayed in the display device after a wait of a preset duration in a case that the exit manner is the passive exit manner, so that the target control device re-accesses the target game by scanning the target graphic code image. The preset duration may be set according to a service requirement or an empirical value. The specific value of the preset duration is not limited in the embodiments of the disclosure.

A specific identification principle for identifying an exit manner in which the target control device exits the target game is as follows. If the user of the target control device actively exits the target game through the target control device, the computer device may generally receive an exit request transmitted by the target control device. Otherwise, the exit request might not be received. Based on this, the computer device may identify the exit manner in which the target control device exits the target game by determining whether the target control device receives the exit request transmitted by the target control device before exiting the target game. If the target control device receives the exit request transmitted by the target control device before exiting the target game, it may be determined that the exit manner in which the target control device exits the target game is the active exit manner. If the target control device does not receive the exit request transmitted by the target control device before exiting the target game, it may be determined that the exit manner in which the target control device exits the target game is the passive exit manner.

Based on the above description, in the embodiments of the disclosure, the access of the control device may be based on an entire life cycle of the target client, not for a single game. In this way, when the user switches from one game to another game, the user can directly access the another game through an existing historical controller without performing a code scanning operation, which can simplify user operations and improve operational convenience of the user, thereby improving user experience and user viscosity and reducing a frequency at which a server responds to the code scanning operation. In addition, after the exit event in which the target control device exits the target game is detected, processing may be performed correspondingly according to a specific exit manner, which fully considers a user requirement and can further improve the user experience.

Based on the above description, the specific principle of how to control the target game through the target control device will be further elaborated below from the perspective of interaction between the SDK of the target game, the central server, the edge server, and the control devices based on an example in which the target game is the cloud game in the cloud game system shown in FIG. 1*f*.

I. The SDK of the Target Game and the Style File of the Virtual Controller Involved in the Target Game are Deployed in the Cloud Game System.

Firstly, the game developer of the target game may apply for, in advance, an app ID (an application identifier of a game application running the target game) corresponding to the target game in the cloud game system as a game identifier of the target game. At the same time, the cloud game system may assign a secret to the game developer as a secret for use in subsequent interface interaction or interface call. Next, the cloud game system may further provide, in the form of the SDK of the target game, the virtual controller required for the target game for the game developer of the target game to perform style development. Correspondingly, the game developer of the target game may customize and develop different styles of virtual controllers for the target game by HTML+CSS. The style of the virtual controller may be typeset and defined by HTML+CSS. Moreover, various styles of the virtual controller developed are locally tested in a device used by the game developer of the target game. The SDK of the target game is generated after the local testing is passed. The SDK includes, but is not limited to, a plurality of styles of the virtual controller involved in the target game, a game identifier of the target game, and a secret.

Then, the game developer of the target game may upload an SDK developed by the game developer to a game server in the cloud game system for deployment. Specifically, the game developer may package the developed SDK into a zip (a compressed format) package and upload the zip package to the game server in the cloud game system for deployment. Correspondingly, the game server in the cloud game system may parse the zip package uploaded by the game developer to obtain an SDK and store the SDK. At the same time, security scanning is performed on the SDK, preventing upload of unsafe codes. In addition, the game server in the cloud game system may further perform online deployment. Specifically, the style file involved in the target game may be deployed in a folder indicated by the game identifier (app ID) of the target game stored in the central server. Folders indicated by different app IDs are isolated from each other. After the style file is successfully deployed, the SDK of the target game may specify the target virtual controller of the corresponding style in the target control device for display according to the game scene of the target game. Optionally, a style may be selected as a default style for the SDK of the target game, so that, when the target control device accesses the target game for the first time, the target control device displays the target virtual control device in the default style.

Similar to the target game, SDKs of other cloud games in the cloud game system may also be acquired in the above manner. A cloud game may define a plurality of styles of a virtual controller, and different styles may correspond to different component layouts, so that different key layouts can be used in different game scenes. A naming format of the style file of the virtual controller may be a concatenation of "control_", the style name, and ".html". For example, a file identifier of the style file of the virtual controller may be any of the following: control_hall.html, control_3v3.html, control_touch.html, and the like.

II. Access Process of the Target Control Device:

For the target game, after control devices used by users intended to play the target game are allowed to access the target game, the users can play the target game. Therefore, at an initial stage of the target game, there is a need to allow relevant users intended to play the target game to access the target game through the control devices used. Specifically, the access process is specifically as follows:

Firstly, the SDK of the target game may be initialized. When the game server starts the target game, the SDK of the target game is initialized. The initialization includes the following operations: entering the game identifier (app ID) and the secret of the target game into the SDK to prove identity; and registering relevant callback interfaces with the SDK, such as a callback interface of a cloud user handler and a callback interface of a pad user handler.

Next, entry of a user may be awaited. The game server may directly start the target game and wait for the user to enter. Correspondingly, any user using the display device may open a game selection interface in the target client run on the display device. The game selection interface includes game entries of one or more cloud games. Then, any user may enter the target game by selecting one game entry of the target game. When any user enters the target game, the SDK of the target game may call back a CloudUserHandler registered during the initialization of the target game. The CloudUserHandler may include a user open ID (user identifier), a nickname, an avatar link, and user terminal device information. The user terminal device information may include, but is not limited to, a terminal type of a terminal device used by the user, for example, information such as "Windows", "Android Mobile", and "Android ID". The user has entered the game only after a game screen of the target game is successfully displayed in the display device, which indicates that the target game has been currently assigned to a specific user and has been seen by the user, as shown in FIG. 5*a*.

Then, the SDK of the target game may transmit a device access request to the edge server. The device access request is used for indicating: a quantity threshold of control devices that are allowed to access the target game. If the target game is one of the N games that is first started in the cloud game system, the edge server may implement, based on a flow chart of code-scanning access shown in FIG. 5*b*, access of the target control device to the target game by code-scanning access. Referring to FIG. 5*b*, an implementation principle of the code-scanning access is as follows:

Stage 1: A target graphic code image is generated on a screen of the display device. When the SDK of the target game is initialized, a persistent connection has been established with the edge server. The persistent connection refers to a communication connection that can support a plurality of data interactions. Therefore, when there is a device access request in the target game, the SDK of the target game may request the edge server to display the target graphic code image in the display device. It is to be understood that, if there is currently no control device accessing the target client (that is, no other cloud games have been started before the target game), the request used for requesting displaying the target graphic code image and transmitted by the SDK of the target game is invalid. Correspondingly, the edge server may transmit an information acquisition request to the central server to request the central server to acquire graphic code information of the target graphic code image. The central server queries, according to a device ID (device identifier) carried in the information acquisition request, a user identifier of the user entering the target game. The user identifier may be a user id logged into the target client. Then, the central server queries, according to the user identifier, a historical control device that has currently accessed the target client, and if not finding the historical control device, generates graphic code information of the target graphic code image. Moreover, the central server transmits the graphic code information of the target graphic code image to the edge server, so that the edge server may notify the target client in the display device after receiving the graphic code information. The target client generates a target graphic code image according to the graphic code information, and displays the target graphic code image.

The target graphic code image may include a communication address of the central server, which is a temporary graphic code identifier (e.g., a two-dimensional code scanning id). Through the temporary graphic code identifier, a session ID, a device ID, and a communication address of the edge server requested may be found. The session ID refers to a temporary identifier generated when the user opens the target client. The session ID has uniqueness and temporality. The uniqueness may ensure that: the session ID remains unchanged when different users or a same user enters different cloud games in different time periods. The temporality may ensure that: the session ID remains unchanged when the target client is opened and used, but the session ID will change if the target client is restarted.

Stage 2: The user of the target control device scans the target graphic code image through the target control device. Specifically, the target graphic code image may be scanned through a client (such as a social client or a game client) with a code scanning function in the target control device. The target control device, after scanning the target graphic code image, may parse the scanned target graphic code image to obtain the communication address of the central server and the graphic code identifier. The target control device establishes a central communication link with the central server based on the communication address of the central server. The central server notifies, based on the central communication link, the target control device of the communication address of the edge server to be connected. The target control device establishes an edge communication link with the edge server based on the communication address of the edge server. Since the SDK establishes the persistent connection with the edge server during the initialization, the control device can directly communicate with the SDK when connected to the edge server, so as to realize access of the target control device to the target game. After the target control device accesses the target game, the edge server may further inform the SDK of the following information: connection of the target control device, a device serial number of the target control device, and user-related information.

As can be seen, the target control device in the embodiments of the disclosure communicates with the SDK through the edge server. The edge server is physically located close to the target control device. Therefore, the communication with the SDK through the edge server can effectively reduce a communication distance, thereby reducing communication time and improving communication efficiency, and then target control data subsequently generated by the target control device can be transmitted to the SDK in a timely manner, improving timeliness and smoothness of the control of the target control device over the target game. Further, the persistent connection is established between the SDK and the edge server, and the persistent connection refers to a communication connection that can support a plurality of data interactions. Therefore, there is no need to perform a connection establishment operation between the SDK and the edge server every time, which can effectively save processing resources and improve communication efficiency.

If the target game is one of the N games that is not first started in the cloud game system, it means that one or more historical control devices have accessed the target client. In this case, the edge server may notify the central server of the following content: a device access requirement of the target game, and a quantity threshold of control devices that are allowed to access the target game. Correspondingly, the central server may realize access of the target control device to the target game based on the quantity threshold by using the device access logic shown in FIG. 5*c*.

Specifically, the central server may determine a quantity threshold x of control devices that are allowed to access the target game, and determine whether a target quantity y of historical control devices that have accessed the target client is greater than or equal to the quantity threshold x. If the target quantity y is greater than or equal to the quantity threshold x, x historical control devices are selected from y historical control devices, and device serial numbers of the selected historical control devices are called back to notify the SDK, so as to notify, by callback, the SDK of access of the control devices. If the target quantity y is less than the quantity threshold x, the device serial numbers of the y historical control devices may be called back to notify the SDK, so as to notify, by callback, the SDK of access of the control devices. Moreover, it is determined whether there is a need to display, in the display device, a target graphic code image for accessing the target game. If yes, the target graphic code image is displayed to enable other control devices to access the target game by scanning the target graphic code image. After the other control devices access the target game by scanning the target graphic code image, device serial numbers of the other control devices accessing the target game may be called back to notify the SDK, so as to notify, by callback, the SDK of access of the control devices.

As can be seen, in this case, the target control device may be one of the historical control devices or one of the other control devices. When the target control device is a historical control device, the target game may be accessed by non-code-scanning access. When the target control device is another control device, the target game may be accessed by code-scanning access. Referring to FIG. 5*d*, an implementation principle of the non-code-scanning access is as follows: The central server may notify a historical control device (such as the target control device), which seeks to activate a connection, of the following information: a communication address of the edge server and a device ID. Correspondingly, the target control device may be connected to the edge server based on the communication address of the edge server and the device ID. Specifically, the target control device may transmit a link establishment request for an edge communication link to the edge server based on the communication address of the edge server and the device ID to request the edge server and the target control device to establish the edge communication link, thereby realizing the connection with the edge server. In addition, the central server may further transmit a device serial number of a connectable historical control device to the edge server, so that the edge server, after receiving the link establishment request transmitted by the target control device, first verifies identity of the target control device according to a device serial number of the central server. Specifically, the identity of the target control device may be verified by verifying whether the device serial number of the central server is consistent with a device serial number carried in the link establishment request. If the identity verification is passed, the edge server agrees to establish the edge communication link with the target control device. The edge communication link is established by verifying the identity of the target control device and when the identity verification is passed, which can effectively improve security and accuracy of the edge communication link.

III. Use Process of the SDK:

Referring to FIG. 5*b* and FIG. 5*d*, whether the target control device accesses the target game by code-scanning access or accesses the target game by non-code-scanning access, after the target control device successfully accesses the target game, the target control device may display the target virtual controller configured to control the target game, and the target game may further conduct two-way communication with the target control device through the SDK.

For example, the SDK of the target game may trigger the target control device to change the style of the target virtual control, or trigger the target control device to perform operations such as a vibration operation and play back multimedia data. Specifically, referring to FIG. 5*e*, it may be determined that the style of the virtual controller should be changed if the SDK detects that there is a scene switch in the target game. Then, a style loading notification is transmitted to the edge server. The style loading notification is used for indicating that: the edge server should notify the target control device to load a style file of a specified style (that is, the determined style). Correspondingly, the edge server may notify the target control device to change the style, deliver a style identifier (such as a style name and a style label) of the specified style and a game identifier (app ID) of the target game to a specified target control device, and transmit a style identifier of the determined style to the target control device through the edge server, so that the target control device can request the central server to load the corresponding style file according to the received style identifier. Correspondingly, the central server may respond to the request of the target control device and return the style file indicated by the style identifier to the target control device, so that the target control device can display the target virtual controller in the corresponding style based on the received style file. Optionally, the target control device may further transmit a loading completion notification to the edge server to notify that the target virtual controller in the corresponding style has been successfully displayed in the target control device, thereby triggering the edge server to forward the loading completion notification to the SDK of the target game. Optionally, if the specified style does not exist or other types of errors occur, the target control device may further notify the SDK of the target game through the edge server.

In another example, after the target control device is disconnected (that is, exits the target game), through a callback event, the SDK of the target game may be immediately notified of: disconnection of the target control device indicated by the device serial number. The callback event may distinguish whether the user actively exits or is passively offline. If the user actively exits, it means that the exit manner of the target control device is active, which may be caused by replacement of a player. Therefore, the SDK can actively pop up the target graphic code image in a center of the display device through at least one of the edge server and the central server to allow a new player to use the corresponding control device to perform code-scanning access. If the user passively exits, it means that the exit manner of the target control device is passive, which may be caused by a poor network environment. Therefore, the SDK may wait for a preset duration and then actively pop up the target graphic code image in a center of the display device through at least one of the edge server and the central server to enable the target control device to perform code-scanning access again.

In another example, when the target virtual controller in any style is controlled, the target control device may acquire target control data generated when the target virtual controller is controlled and transmit the target control data to the SDK, and the SDK transmits the target control data to the game server running the target game, so that the game server can determine a control behavior for the target game according to the target control data, thereby updating a game screen displayed by the display device according to the determined control behavior. As can be seen from the foregoing, the target virtual controller includes a plurality of control components, and the user may control the target virtual controller by controlling the control components, so the target control data may include component identifiers of the controlled control components in the target virtual controller. In addition, the target control device may transmit the target control data to the SDK in the following specific manner: The target control device transmits the target control data to the edge server based on the edge communication link, enabling the edge server to forward the target control device to the SDK based on the persistent connection with the SDK.

In the embodiments of the disclosure, description is only based on an example in which the target virtual controller is controlled through the control components, which is not limited. For example, for the target virtual controller in any style, the user of the target control device might not only realize the control over the target virtual controller by controlling the control components in the target virtual controller, but also realize the control over the target virtual controller by controlling one or more sensors in the target control device to move. In other words, control data that may be supported by the target virtual controller includes, but is not limited to, event data of a touch event, sensor data, and event data of a custom event (such as an event for controlling custom left and right keys).

The touch event is acquired in units of control components, and event types include DOWN, MOVE, UP, and the like. Touch data of the touch event may include: a component identifier of a touched control component, or position coordinates of a touch point in a relative coordinate system. As shown in FIG. 6, for the touch event on a "left" control component, the relative coordinate system is a coordinate system formed by an upper left corner (0, 0) and a lower right corner (1.0, 1.0) of a region where the "left" control component is located. In the relative coordinate system, position coordinates of a black touch point are (0.2, 0.3). The sensor data may include: gyroscope data, accelerometer data, compass data, device direction data, gravity sensing data, and the like. Types of the custom event may include DOWN and UP, that is, an event for pressing down the control component and an event for lifting up the control component. The types of the custom event may be represented by numbers, and specific values may be customized.

For the custom event, the cloud game system may provide a JavaScript (js) file, and provide several interfaces for transmitting the control data.

All the control data is given to the SDK on a single user basis, so as to be given to the game server where the target game is located. Users corresponding to different control devices are independent of each other. For the touch event and the sensor data, current values may be read when the display device displays each frame of the game screen, so as to obtain touch data and sensor data. The custom event (generally component click-through or long press), may be registered and called back, so as to be called back when the event occurs. Certainly, the custom event may also be acquired when each frame of the game screen is displayed.

The display of the style and the transmission of the control data as referred to in the above embodiments are both implemented on the basis of webpages by HTML+CSS+js. For example, the target control device displays the target virtual controller in any style in the form of a webpage. However, in another embodiment, the display of the style and the transmission of the control data may also be implemented by using another solution. For example, a particular client may be developed in a custom description language, and the particular client may be installed in the target control device, so that the target virtual controller in any style can be drawn and displayed through the particular client. In addition, in the embodiments of the disclosure, how to adjust the style of the target virtual controller displayed by the target control device is elaborated by taking switching between various game scenes under the target game as an example. The same applies to switching between game scenes of different games. For example, in the case of switching from a fighting game to a racing game, the style of the target virtual controller may be changed from a gamepad style to a racing style.

Based on the above description, the embodiments of the present application may have the following beneficial effects:

1) The target virtual controller configured to control the target game is independently displayed by introducing the target control device, so that control over and display of the target game are separated from each other when the target game is controlled through the target virtual controller, which prevents problems of consumption of a large number of operating resources and degradation of operational performance caused by joint display of the game screen and a specified component configured to control the game on a same user equipment. Moreover, compared with the use of a physical handle, the use of a mobile device as a control device is more convenient for the user, which can effectively improve convenience of game control.
2) During the running of any game, a change in the style of the virtual controller according to different game scenes is supported, so that the style after each change fits a current game scene, the user does not need to manually switch the style of the virtual controller through the control device, and the control device does not need to deal with redundant user operations, but merely responds to control operations triggered in the virtual controller fitting the current game scene, which reduces operating pressure of the control device. Moreover, the virtual controller fitting the current game scene also enables the user to control the current game scene in the target game through fewer operations, which reduces a number of times the control device responds to the user operations and reports operation data to the display device. Especially in a case that there are a plurality of control devices connected to the display device, for each control device, a quantity of data interactions between the control device and the display device can be reduced, so response pressure of the display device can be greatly reduced, and it is also convenient for the user to perform game operations in the current game scene, which improves convenience of the game and accuracy of the game operations, thereby improving the user's game experience and the user's game immersion.
3) Transmission of control data from various sensors including a gyroscope, an accelerometer, and a gravity sensor may be supported between the target control device and the SDK. Through the transmission of the control data of the sensors, the SDK can comprehensively analyze the user's control operation on the control device based on a plurality of pieces of control data, which improves accuracy of analysis results, thereby realizing accurate update of the game screen based on the analysis results.
4) The support for controlling the control device to perform a vibration operation and a multimedia data playback operation can effectively enhance interaction between the control device and the user.
5) When the user changes the game, there is no need for the user to perform the code scanning operation again, which has high convenience.
6) The style of the virtual controller is customized, which has high flexibility and improves user experience. For some game scenes that require fewer control components, a display region of each control component may be defined as a large-scale region on the screen of the display device to facilitate user control, thereby preventing the problem that the user further needs to see the control device during the control.

Based on the above description of the embodiments of the device control method, an embodiment of the disclosure further discloses a device control apparatus. The device control apparatus may be a computer program (including program code) run on a computer device. The device control apparatus may perform the method shown in FIG. 2. Referring to FIG. 7, the data control apparatus may run the following units:

a display unit 701 configured to display, in a target control interface of a target control device in a process of a display device displaying a game screen in a first game scene of a target game, a target virtual controller in a first style fitting a first game scene; and a processing unit 702 configured to update, in the first game scene, the game screen in the first game scene displayed in the display device in a case that the target virtual controller in the first style is controlled;

the display unit 701 being further configured to display, in the target control interface in response to switching from the first game scene to a second game scene of the target game, the target virtual controller in a second style fitting the second game scene; and the processing unit 702 being further configured to update, in the second game scene, a game screen in the second game scene displayed in the display device in a case that the target virtual controller in the second style is controlled.

In an implementation, the target game includes at least a target object. The target object refers to: an object controlled through a target virtual controller. Correspondingly, the processing unit 702 may be further configured to:

control, in a case that there is a control prompt event about the target object, the target control device to perform a prompt operation according to the control prompt event. The prompt operation includes at least one of the following: a vibration operation and a multimedia data output operation.

The control prompt event includes: an abnormal event generated by the target object in the process of controlling the target object through the target virtual controller; or an event in which there is a need to notify the user of the target control device to control the target object.

In another implementation, the target virtual controller has a cooperative virtual controller, and the cooperative virtual controller is displayed in a control device different from the target control device. The cooperative virtual controller refers to: a virtual controller configured to control the target object in cooperation with the target virtual controller.

In a same game scene, a style of the cooperative virtual controller may be different from that of the target virtual controller.

In another implementation, the display device displays game screens of N games through a target client, and the N games include the target game. N is an integer greater than 1. After accessing the target game, the target control device displays the target virtual controller in styles fitting game scenes of the target game. Correspondingly, the processing unit 702 may be further configured to:

display, in the display device in response to the target game being one of the N games that is first started, a target graphic code image for accessing the target game after the target game is started, to enable the target control device to access the target game by scanning the target graphic code image.

In another implementation, the processing unit 702 may be further configured to:

determine historical control devices that have accessed the target client in response to the target game being one of the N games that is not first started; the historical control devices accessing the target client by accessing any one of the N games that is started before the target game; and each of the historical control devices continuing to access the target client after the accessed game is closed, until the target client ends operation;

count a target quantity of the determined historical control devices, and determine a quantity threshold of control devices that are allowed to access the target game;

select quantity-threshold historical control devices from the target quantity of historical control devices in a case that the target quantity is greater than the quantity threshold; and notify the selected historical control devices to access the target game, the target control device being one of the selected historical control devices.

In another implementation, the processing unit 702 may be further configured to:

notify the historical control devices that have accessed the target client to access the target game in a case that the target quantity is less than the quantity threshold; and display, in the display device, the target graphic code image for accessing the target game, to enable other control devices to access the target game by scanning the target graphic code image.

The other control devices include: one or more control devices in all control devices in a same physical environment as the display device other than the historical control devices that have accessed the target client. The target control device is one of the historical control devices that have accessed the target client, or one of the other control devices.

In another implementation, the processing unit 702 may be further configured to:

determine a reference quantity of control devices required by a target game scene of the target game in a case that the target quantity is less than the quantity threshold, the target game scene referring to: a game scene in response to detecting that the target quantity is less than the quantity threshold;

perform, in a case that the target quantity is less than the reference quantity, the operation of displaying, in the display device, the target graphic code image for accessing the target game, to enable other control devices to access the target game by scanning the target graphic code image; and wait to switch the game scene of the target game in a case that the target quantity is greater than or equal to the reference quantity, and perform, in a case that a quantity of control devices required by the switched game scene is greater than the target quantity, the operation of displaying, in the display device, the target graphic code image for accessing the target game, to enable other control devices to access the target game by scanning the target graphic code image.

In another implementation, the processing unit 702, when configured to display, in the display device, the target graphic code image for accessing the target game, may be further configured to:

calculate, according to a quantity of control devices that have accessed the target game and a quantity of accessed control devices required for the target game, an image quantity of target graphic code images for accessing the target game; and display the image quantity of target graphic code images in the display device, one target graphic code image corresponding to one object in the target game. An object controlled through the target virtual controller is an object corresponding to the target graphic code image and scanned by the target control device.

In another implementation, the processing unit 702 may be further configured to:

identify an exit manner in which the target control device exits the target game in response to detecting an exit event in which the target control device exits the target game, the exit manner including an active exit manner or a passive exit manner;

display the target graphic code image in the display device in a case that the exit manner is the active exit manner, so that control devices in all the control devices in the same physical environment as the display device other than the target control device access the target game by scanning the target graphic code image; and display the target graphic code image in the display device after a wait of a preset duration in a case that the exit manner is the passive exit manner, so that the target control device re-accesses the target game by scanning the target graphic code image.

In another implementation, the target game is a cloud game in a cloud game system, and the cloud game system includes a central server and an edge server. The target graphic code image includes: a communication address of the central server and a graphic code identifier. The graphic code identifier is associated with a communication address of the edge server.

The target control device accesses the target game by scanning the target graphic code image in the following manner:

scanning, by the target control device, the target graphic code image, and parsing the scanned target graphic code image to obtain the communication address of the central server and the graphic code identifier;

establishing a central communication link with the central server based on the communication address of the central server;

generating an address acquisition request carrying the graphic code identifier, and transmitting the address acquisition request to the central server based on the central communication link to request the central server to return the communication address of the edge server according to the graphic code identifier;

establishing an edge communication link with the edge server based on the communication address of the edge server after the communication address of the edge server is received; and determining that the target control device accesses the target game after the edge communication link is successfully established.

In another implementation, the target game is a cloud game in a cloud game system, and the cloud game system includes a central server and an edge server.

Each of the historical control devices maintains a central communication link with the central server and an edge communication link with the edge server after accessing a corresponding game; and disconnects the edge communication link with the edge server after the accessed game is closed.

Any one of the historical control devices is notified to access the target game in the following manner: transmitting a server connection notification to the historical control device through the central server to notify the historical control device to re-establish the edge communication link with the edge server based on a communication address of the edge server.

According to another embodiment of the disclosure, a part or all of the units of the device control apparatus shown in FIG. 7 may be combined into one or several other units, or one (or more) of the units may be divided into a plurality of units of smaller functions. In this way, same operations can be implemented without affecting implementation of the technical effects of the embodiments of the disclosure. The foregoing units are divided based on logical functions. In an actual application, a function of one unit may be implemented by a plurality of units, or functions of a plurality of units are implemented by one unit. In another embodiment of the disclosure, the device control apparatus may also include another unit. In an actual application, these functions may also be cooperatively implemented by another unit and may be cooperatively implemented by a plurality of units.

According to another embodiment of the disclosure, a computer-readable instruction (including program code) that can execute the device control method shown in FIG. 2 may run on a computing device including processing elements and storage elements such as a central processing unit (CPU), a random access storage medium (RAM), and a read-only storage medium (ROM), to construct the device control apparatus shown in FIG. 7, and implement the device control method according to the embodiments of the disclosure. The computer-readable instruction may be recorded in, for example, a computer-readable storage medium, and may be loaded into the foregoing computing device by using the computer-readable storage medium, and run in the computing device.

Based on the description of the above method embodiments and apparatus embodiments, an embodiment of the disclosure further provides a computer device. Referring to FIG. 8, the computer device includes at least a processor 801, an input interface 802, an output interface 803, and a computer-readable storage medium 804. Moreover, the processor 801, the input interface 802, the output interface 803, and the computer-readable storage medium 804 in the computer device may be connected through a bus or in another manner.

The computer-readable storage medium 804 may be stored in a memory of the computer device. The computer-readable storage medium 804 is configured to store a computer-readable instruction. The computer-readable instruction includes a program instruction. The processor 801 (or referred to as a CPU) is a computing core and a control core of the computer device, which is adapted to implement one or more instructions, and specifically to load and execute one or more instructions so as to implement the corresponding method flow or corresponding function. In an embodiment, the processor 801 in the embodiments of the disclosure may be configured to implement the device control method according to the embodiments of the disclosure.

An embodiment of the disclosure further provides a computer-readable storage medium (memory). The computer-readable storage medium is a memory device in the computer device and is configured to store programs and data. It is to be understood that the computer-readable storage medium here may include a built-in storage medium of the computer device, and certainly, may also include an expanded storage medium supported by the computer device. The computer-readable storage medium provides a storage space. The storage space stores an operating system of the computer device. Moreover, one or more instructions suitable for being loaded and executed by the processor 801 are also stored in the storage space. The instructions may be one or more computer-readable instructions (including program code). The computer-readable storage medium herein may be a high-speed RAM memory or a non-transitory memory, for example, at least one magnetic disk memory. Optionally, the computer-readable storage medium may be at least one computer-readable storage medium located away from the foregoing processor.

In an embodiment, the processor 801 may load and execute one or more instructions stored in the computer-readable storage medium to implement corresponding steps in the embodiments of the device control method shown in FIG. 2.

According to an aspect of the disclosure, an embodiment of the disclosure further provides a computer program product or a computer-readable instruction. The computer program product includes the computer-readable instruction. The computer-readable instruction is stored in a computer-readable storage medium. A processor of a computer device reads the computer-readable instruction from the computer-readable storage medium, and the processor executes the computer-readable instruction, to cause the computer device to perform the method provided in the various optional manners of the embodiment aspects of the device control method shown in FIG. 2.

Besides, it is to be understood that the descriptions disclosed above are merely exemplary embodiments of the disclosure, and certainly are not intended to limit the scope of the claims of the disclosure. Therefore, equivalent variations made in accordance with the claims of the disclosure shall still fall within the scope of the disclosure.

What is claimed is:

1. A device control method, performed by at least one processor, the method comprising:

displaying, in a display device, in response to a target game being one of a plurality of games that is first started, a target graphic code image for accessing the target game after the target game is started, to enable a target control device to access the target game by scanning the target graphic code image;

displaying, in a target control interface of the target control device, responsive to the display device displaying a game screen for a first game scene of the target game, a target virtual controller in a first style fitting the first game scene;

updating the game screen for the first game scene displayed in the display device responsive to control via the target virtual controller in the first style;

displaying, in the target control interface, responsive to the game screen displayed by the display device switching from the first game scene to a second game scene of the target game, the target virtual controller in a second style fitting the second game scene; and updating a game screen for the second game scene displayed in the display device responsive to control via the target virtual controller in the second style.

2. The method according to claim 1, wherein the target game includes at least a target object, the target object being an object controlled through the target virtual controller, the method further comprising controlling, responsive to a control prompt event about the target object, the target control device to perform a prompt operation according to the control prompt event, the prompt operation comprising at least one of: a vibration operation or a multimedia data output operation, wherein the control prompt event includes at least one of: an abnormal event generated by the target object while controlling the target object through the target virtual controller, or an event in which there is a need to notify a user of the target control device to control the target object.

3. The method according to claim 2, wherein the target virtual controller corresponds to a cooperative virtual controller, the cooperative virtual controller being displayed in a control device different from the target control device, the cooperative virtual controller being a virtual controller via which the target object is controlled in cooperation with the target virtual controller, and wherein a style of the cooperative virtual controller is different from that of the target virtual controller in a same game scene.

4. The method according to claim 1, wherein the display device displays game screens of each of a plurality of games through a target client, the plurality of games comprising the target game, and wherein the target control device, after accessing the target game, displays the target virtual controller in styles fitting game scenes of the target game.

5. The method according to claim 4, further comprising:

identifying historical control devices that have accessed the target client in response to the target game being one of the plurality of games that is not first started, a game accessed by the historical control devices being any one of the plurality of games that is started before the target game, each of the historical control devices continuing to access the target client after the accessed game is closed, until the target client ends operation, a quantity of identified historical control devices being a target quantity H;

determining a quantity threshold T of control devices that are allowed to access the target game;

selecting T historical control devices from the identified historical control devices, responsive to H being greater than T; and notifying the selected historical control devices to access the target game, the target control device being one of the selected historical control devices.

6. The method according to claim 5, further comprising:

notifying the historical control devices that have accessed the target client to access the target game responsive to H being less than or equal to T; and displaying, in the display device, the target graphic code image for accessing the target game, to enable additional control devices to access the target game by scanning the target graphic code image, the additional control devices being one or more control devices in a same physical environment as the display device other than the historical control devices that have accessed the target client, the target control device being one of a historical control device and an additional control device.

7. The method according to claim 6, further comprising:

displaying a target game scene of the target game responsive to H being less than T;

determining a reference quantity R1 of control devices required for the target game scene of the target game responsive to H being less than T, the target graphic code image being displayed in the display device responsive to H being less than R1; and delaying a switch to a different game scene of the target game responsive to H being greater than or equal to R1 but less than a quantity R2 of control devices required for the different game scene, the target graphic code image being displayed in the display device responsive to R2 being greater than H.

8. The method according to claim 5, wherein the target game is a cloud game in a cloud game system including a central server and an edge server, wherein each of the historical control devices:

maintains a central communication link with the central server and an edge communication link with the edge server after accessing a corresponding game, and disconnects the edge communication link with the edge server after the accessed game is closed, and wherein each of the historical control devices is notified to access the target game by transmitting a server connection notification to the historical control device through the central server, to thereby notify the historical control device to re-establish the edge communication link with the edge server based on a communication address of the edge server.

9. The method according to claim 4, wherein the displaying, in the display device, the target graphic code image comprises:

calculating, based on a quantity of control devices that have accessed the target game and a quantity of accessed control devices required for the target game, an image quantity I of target graphic code images for accessing the target game; and displaying I target graphic code images in the display device, each target graphic code image corresponding to a respective object in the target game, wherein an object controlled through the target virtual controller is an object corresponding to the target graphic code image and scanned by the target control device.

10. The method according to claim 4, further comprising:

identifying an exit manner by which the target control device exits the target game responsive to detecting an exit event in which the target control device exits the target game, the exit manner comprising one of an active exit manner and a passive exit manner;

displaying the target graphic code image in the display device responsive to the exit manner comprising the active exit manner, thereby enabling control devices in all the control devices in the same physical environment as the display device other than the target control device to access the target game by scanning the target graphic code image; and displaying the target graphic code image in the display device after a wait of a preset duration in responsive to the exit manner comprising the passive exit manner, thereby enabling the target control device to re-access the target game by scanning the target graphic code image.

11. The method according to claim 4, wherein the target game is a cloud game in a cloud game system including a central server and an edge server, wherein the target graphic code image indicates a communication address of the central server and a graphic code identifier, the graphic code identifier being associated with a communication address of the edge server, and wherein the target control device accesses the target game by:

scanning the target graphic code image;

parsing the scanned target graphic code image to obtain the communication address of the central server and the graphic code identifier;

establishing a central communication link with the central server based on the communication address of the central server;

generating an address acquisition request carrying the graphic code identifier;

transmitting the address acquisition request to the central server based on the central communication link to request the central server to return the communication address of the edge server according to the graphic code identifier;

establishing an edge communication link with the edge server based on the communication address of the edge server after the communication address of the edge server is received; and determining that the target control device accesses the target game after the edge communication link is successfully established.

12. One or more non-transitory computer-readable storage media storing computer-readable instructions which, when executed by one or more processors, cause the one or more processors to perform the device control method according to claim 1.

13. A device control apparatus, comprising:

a display unit configured to:

display, in a display device, in response to a target game being one of a plurality of games that is first started, a target graphic code image for accessing the target game after the target game is started, to enable a target control device to access the target game by scanning the target graphic code image;

display, in a target control interface of the target control device, responsive to the display device displaying a game screen for a first game scene of the target game, a target virtual controller in a first style fitting the first game scene, and display, in the target control interface, responsive to the game screen displayed by the display device switching from the first game scene to a second game scene of the target game, the target virtual controller in a second style fitting the second game scene; and a processing unit configured to:

update the game screen for the first game scene displayed in the display device responsive to control of the target virtual controller in the first style, and update a game screen for the second game scene displayed in the display device responsive to control of the target virtual controller in the second style.

14. The apparatus according to claim 13, wherein the target game includes at least a target object, the target object being object controlled through the target virtual controller;

wherein the processing unit is further configured to control, responsive to a control prompt event about the target object, the target control device to perform a prompt operation according to the control prompt event, the prompt operation comprising at least one of a vibration operation or a multimedia data output operation; and wherein the control prompt event includes at least one of:

an abnormal event generated by the target object while controlling the target object through the target virtual controller, or an event in which there is a need to notify a user of the target control device to control the target object.

15. The apparatus according to claim 14, wherein the target virtual controller corresponds to a cooperative virtual controller, the cooperative virtual controller being displayed in a control device different from the target control device, the cooperative virtual controller being a virtual controller via which the target object is controlled in cooperation with the target virtual controller; and wherein a style of the cooperative virtual controller is different from that of the target virtual controller in a same game scene.

16. The apparatus according to claim 13, wherein the display device displays game screens of each of a plurality of games through a target client, the plurality of games comprising the target game;

wherein the target control device, after accessing the target game, displays the target virtual controller in styles fitting game scenes of the target game.

17. The apparatus according to claim 16, wherein the processing unit is further configured to:

identify historical control devices that have accessed the target client in response to the target game being one of the plurality of games that is not first started, a game accessed by the historical control devices being any one of the plurality of games that is started before the target game, each of the historical control devices continuing to access the target client after the accessed game is closed, until the target client ends operation, a number of identified historical control devices being a target quantity H;

determine a quantity threshold T of control devices that are allowed to access the target game;

select T historical control devices from the identified historical control devices responsive to H being greater than T; and notify the selected historical control devices to access the target game, the target control device being one of the selected historical control devices.

18. The apparatus according to claim 17, wherein the processing unit is further configured to:

notify the historical control devices that have accessed the target client to access the target game responsive to H being less than or equal to T; and display, in the display device, the target graphic code image for accessing the target game, to enable additional control devices to access the target game by scanning the target graphic code image, wherein the additional control devices are one or more control devices in a same physical environment as the display device other than the historical control devices that have accessed the target client, the target control device being one of a historical control device and an additional control device.

19. The apparatus according to claim 18, wherein the processing unit is further configured to:

display a target game scene of the target game responsive to H being less than T;

determine a reference quantity R1 of control devices required for the target game scene of the target game responsive to H being less than T, the target graphic code image being displayed in the display device responsive to H being less than R1; and delay a switch to a different game scene of the target game responsive to H being greater than or equal to R1 but less than a quantity R2 of control devices required for the different game scene, the target graphic code image being displayed in the display device responsive to R2 being greater than H.

20. The apparatus according to claim 16, wherein the processing unit is further configured to:

calculate, based on a quantity of control devices that have accessed the target game and a quantity of accessed control devices required for the target game, an image quantity I of target graphic code images for accessing the target game; and display I target graphic code images in the display device, each target graphic code image corresponding to a respective object in the target game, wherein an object controlled through the target virtual controller is an object corresponding to the target graphic code image and scanned by the target control device.

* * * * *